United States Patent
Qin

(10) Patent No.: US 12,101,844 B2
(45) Date of Patent: Sep. 24, 2024

(54) WIRELESS COMMUNICATION SYSTEM, METHOD, BASE STATION, USER EQUIPMENT AND DEVICE

(71) Applicant: Sony Group Corporation, Tokyo (JP)

(72) Inventor: Zhongbin Qin, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/068,542

(22) Filed: Dec. 20, 2022

(65) Prior Publication Data

US 2023/0120161 A1   Apr. 20, 2023

Related U.S. Application Data

(63) Continuation of application No. 17/531,806, filed on Nov. 22, 2021, now abandoned, which is a
(Continued)

(30) Foreign Application Priority Data

Aug. 13, 2013   (CN) .......................... 201310351507.7

(51) Int. Cl.
*H04W 76/30*   (2018.01)
*H04W 24/02*   (2009.01)
(Continued)

(52) U.S. Cl.
CPC .......... *H04W 76/30* (2018.02); *H04W 24/02* (2013.01); *H04W 76/10* (2018.02); *H04W 88/06* (2013.01)

(58) Field of Classification Search
CPC ...... H04W 76/30; H04W 76/10; H04W 24/02
(Continued)

(56) References Cited

U.S. PATENT DOCUMENTS

2009/0253433 A1   10/2009  Voyer et al.
2012/0142278 A1*   6/2012  Wang .................... H04W 76/22
                                                                  455/68
(Continued)

FOREIGN PATENT DOCUMENTS

CN           1791270 A     6/2006
CN         101502019 A     8/2009
(Continued)

OTHER PUBLICATIONS

International Search Report Issued Nov. 15, 2014 in PCT/CN14/83978 Filed Aug. 8, 2014.
(Continued)

*Primary Examiner* — Faisal Choudhury
(74) *Attorney, Agent, or Firm* — XSENSUS LLP

(57) ABSTRACT

A wireless communication system, a method, a base station, user equipment and a device. An electronic device for a user equipment in a wireless communication system, wherein the user equipment simultaneously performs wireless data connections with a first base station and a second base station over different carriers, the electronic device including: circuitry configured to, acquire a notification to release the wireless data connection between the user equipment and the first base station from the second base station, if a release triggering node judges that a release condition is satisfied; and release the wireless data connection with the first base station based on the notification, wherein the release triggering node is either the first base station or the second base station.

36 Claims, 19 Drawing Sheets

Related U.S. Application Data continuation of application No. 16/693,387, filed on Nov. 25, 2019, now Pat. No. 11,212,868, which is a continuation of application No. 14/904,883, filed as application No. PCT/CN2014/083978 on Aug. 8, 2014, now Pat. No. 10,506,661.

(51) Int. Cl.
*H04W 76/10* (2018.01)
*H04W 88/06* (2009.01)

(58) Field of Classification Search
USPC .......................................................... 370/329
See application file for complete search history.

(56) References Cited

U.S. PATENT DOCUMENTS

| | | | |
|---|---|---|---|
| 2012/0287873 A1* | 11/2012 | Liu ....................... | H04W 76/10 370/329 |
| 2014/0057634 A1 | 2/2014 | Chang et al. | |
| 2014/0162633 A1* | 6/2014 | Hwang ................. | H04W 76/14 455/67.11 |
| 2014/0293958 A1* | 10/2014 | Teyeb ............... | H04W 36/0069 370/331 |
| 2014/0349659 A1 | 11/2014 | Ishii | |
| 2015/0043492 A1 | 2/2015 | Baek et al. | |
| 2015/0131535 A1 | 5/2015 | Wallentin et al. | |
| 2015/0296495 A1 | 10/2015 | Yasuda et al. | |
| 2016/0007403 A1 | 1/2016 | Futaki et al. | |
| 2016/0066237 A1 | 3/2016 | Kato et al. | |
| 2016/0165627 A1* | 6/2016 | Uemura .................. | H04L 5/001 370/336 |
| 2016/0219475 A1* | 7/2016 | Kim ...................... | H04W 76/27 |
| 2016/0374077 A1 | 12/2016 | Fukuta et al. | |

FOREIGN PATENT DOCUMENTS

| | | |
|---|---|---|
| CN | 101568142 A | 10/2009 |
| CN | 102209398 A | 10/2011 |
| CN | 102577513 A | 7/2012 |
| CN | 102802220 A | 11/2012 |
| CN | 102893547 A | 1/2013 |
| EP | 2083536 A1 | 7/2009 |
| WO | 2012/172689 A1 | 12/2012 |
| WO | 2013/009892 A1 | 1/2013 |
| WO | 2013/010005 A1 | 1/2013 |

OTHER PUBLICATIONS

Office Action dated Dec. 2, 2019, issued in corresponding Chinese Patent Application No. 201310351507.7, 15 pages.
Broadcom Corporation, "Mobility for Dual Connectivity", 3GPP TSG RAN WG2 Meeting #81bis, R2-130990, Apr. 15-19, 2013, Chicago, USA.

* cited by examiner

WIRELESS COMMUNICATION SYSTEM, METHOD, BASE STATION, USER EQUIPMENT AND DEVICE

CROSS-REFERENCE TO RELATED APPLICATIONS

The present application is a continuation of U.S. application Ser. No. 17/531,806, filed Nov. 22, 2021, which is a continuation of U.S. application Ser. No. 16/693,387, filed Nov. 25, 2019 (now U.S. Pat. No. 11,212,868), which is a continuation of U.S. application Ser. No. 14/904,883, filed Jan. 13, 2016 (now U.S. Pat. No. 10,506,661), which is based on PCT filing PCT/CN2014/083978, filed Aug. 8, 2014, which claims priority to CN 201310351507.7, filed Aug. 13, 2013, the entire contents of each are incorporated herein by reference.

FIELD OF THE INVENTION

The present disclosure relates to a wireless communication system and a method, base station, user equipment and device in the wireless communication system, and more particularly, to a procedure in a wireless communication system in which a user equipment simultaneously performs wireless data connections with a plurality of base stations over different carriers, in the procedure, the user equipment releases wireless data connection with some of the base stations and/or transfers part or all of data bearers with regard to these base stations to other base stations under specific conditions.

BACKGROUND OF THE INVENTION

Currently, in the wireless communication system, a technology in which the user equipment simultaneously performs wireless data connections with a plurality of base stations over different carriers has been widely applied. However, in some cases, such as cases in which wireless link failure occurs between the user equipment and a certain base station, it needs to share load for a certain base station, a primary carrier signal quality between the user equipment and a certain base station is low or the like, it might need to release the wireless data connection between the user equipment and the base station and/or transfer part or all of the data bearers with regard to this base station to other base station.

SUMMARY OF THE INVENTION

A brief summary of the disclosure will be given below to provide basic understanding of some aspects of the disclosure. However, it shall be appreciated that this summary is neither exhaustively descriptive of the disclosure nor intended to define essential or important components or the scope of the disclosure but is merely for the purpose of presenting some concepts of the disclosure in a simplified form and hereby acts as a preamble of more detailed descriptions which will be presented later.

In view of the above circumstances, an object of the present disclosure is to provide a wireless communication system and a method, base station, user equipment and device in the wireless communication system, which are capable of enabling to trigger release of wireless data connection between the user equipment and some of the base stations and/or transferring part or all of the data bearers with regard to these base stations to other base stations if specific conditions are satisfied in the wireless communication system, in which the user equipment simultaneously performs wireless data connections with a plurality of base stations over different carriers. Thus, it is possible to ensure the user equipment obtains relatively ideal service quality from the base station.

According to an aspect of the disclosure, there is provided an electronic device for a user equipment in a wireless communication system, wherein the user equipment simultaneously performs wireless data connections with a first base station and a second base station over different carriers, the electronic device comprising: circuitry configured to, acquire a notification to release the wireless data connection between the user equipment and the first base station from the second base station, if a release triggering node judges that a release condition is satisfied; and release the wireless data connection with the first base station based on the notification, wherein the release triggering node is either the first base station or the second base station.

According to another aspect of the disclosure, there is also provided an n electronic device for a base station in a wireless communication system, wherein a user equipment simultaneously performs wireless data connections with the base station and other base station over different carriers, and the base station releases the wireless data connection with the user equipment if a release triggering node judges a release condition is satisfied, the electronic device comprising: circuitry configured to receive notification information from the other base station to release the wireless data connection between the base station and the user equipment; and release the wireless data connection between the user equipment and the base station and transfer the data bearers to the other base station for transmission, wherein the data bearers are directly from core network and/or forwarded from the other base station.

According to another aspect of the disclosure, there is also provided an electronic device for a base station in a wireless communication system, wherein the user equipment simultaneously performs wireless data connections with the base station and other base station over different carriers, and the other base station releases the wireless data connection with the user equipment if a release triggering node judges a release condition is satisfied, the base station comprising circuitry configured to: generate notification information for the other base station to release the wireless data connection between the other base station and the user equipment; and notify to the user equipment release of the wireless data connection between the user equipment and the other base station, wherein data bearers transmitted by the other base station are directly from core network and/or forwarded from the base station.

According to another aspect of the disclosure, there is also provided electronic device in a wireless communication system, wherein the wireless communication system comprises a first base station, a second base station and a user equipment, the user equipment simultaneously performs wireless data connections with the first base station and the second base station over different carriers, and a release triggering node triggers a release procedure to release the wireless data connection between the first base station and the user equipment if it is judged that a release condition is satisfied, the electronic device comprising circuitry configured to: receive one or more of the following from the second base station: information about the second base station, information about the first base station, information about core network bearers corresponding to data bearers transmitted by the first base station, information about the release condition, information about master-slave relationship between the second base station and the first base station and information about the user equipment.

According to another aspect of the disclosure, there is also provided a method for use in a wireless communication system, wherein the wireless communication system comprises a first base station, a second base station and a user equipment, and the user equipment simultaneously performs wireless data connection with the first base station and the second base station over different carriers, the method comprising: a release judging step of judging whether a release condition is satisfied by a release triggering node; and a release triggering step of triggering a release procedure to release the wireless data connection between the first base station and the user equipment by the release triggering node if it is judged that the release condition is satisfied.

According to an aspect of the disclosure, there is provided a wireless communication system including: a deactivated base station; a non-deactivated base station; and a user equipment, in which the user equipment simultaneously performs wireless data connections with the deactivated base station and the non-deactivated base station over different carriers, and a deactivation triggering node triggers, if it is judged that a deactivation condition is satisfied, a deactivation procedure to release the wireless data connection between the deactivated base station and the user equipment.

According to a preferred embodiment of the disclosure, the deactivation triggering node may be the deactivated base station, the non-deactivated base station or the user equipment.

According to another preferred embodiment of the disclosure, if the deactivation triggering node is the user equipment, in a case that the deactivation condition is satisfied, the user equipment issues a notification to the non-deactivated base station to trigger the deactivation procedure, the non-deactivated base station performs admission control, and the deactivated base station releases, upon being informed of the non-deactivated base station having performed the admission control, unaccepted data bearers among data bearers between the user equipment and the deactivated base station and transfers accepted data bearers among the data bearers to the non-deactivated base station for transmission.

According to another preferred embodiment of the disclosure, if the deactivation triggering node is the deactivated base station, the non-deactivated base station performs admission control and issues a notification to the deactivated base station after receiving a message for triggering the deactivation procedure issued by the deactivated base station, and the deactivated base station releases, according to the notification from the non-deactivated base station, unaccepted data bearers among data bearers between the user equipment and the deactivated base station and transfers accepted data bearers among the data bearers to the non-deactivated base station for transmission.

According to another preferred embodiment of the disclosure, if the deactivation triggering node is the non-deactivated base station, the non-deactivated base station performs admission control directly after deciding to trigger the deactivation procedure and issues a notification to the deactivated base station, and the deactivated base station releases, according to the notification from the non-deactivated base station, unaccepted data bearers among data bearers between the user equipment and the deactivated base station and transfers accepted data bearers among the data bearers to the non-deactivated base station for transmission.

According to another preferred embodiment of the disclosure, the user equipment directly reports a mobility measurement result of a carrier of the deactivated base station to the non-deactivated base station, or the user equipment reports the mobility measurement result to the deactivated base station and the mobility measurement result is reported to the non-deactivated base station via the deactivated base station to serve as a reference for triggering the deactivation procedure by the non-deactivated base station.

According to another preferred embodiment of the disclosure, the user equipment releases, upon being informed of the non-deactivated base station having performed the admission control, the unaccepted data bearers and transmits and receives the accepted data bearers over a service carrier of the non-deactivated base station.

According to another preferred embodiment of the disclosure, the non-deactivated base station notifies a core network to release core network bearers corresponding to the unaccepted data bearers after completing the admission control, or the deactivated base station notifies the core network to release the core network bearers corresponding to the unaccepted data bearers after receiving a notification about the deactivation procedure from the non-deactivated base station.

According to another preferred embodiment of the disclosure, if data of the deactivated base station is directly forwarded from the non-deactivated base station, the non-deactivated base station stops continuing to forward data to the deactivated base station while performing the admission control, otherwise, a core network triggers path transfer operation for core network bearers corresponding to the accepted data bearers after receiving a notification about the deactivation procedure, which is issued by the non-deactivated base station after completing the admission control.

According to another preferred embodiment of the disclosure, the deactivation condition comprises at least one of the following: a primary carrier signal quality between the user equipment and the deactivated base station is lower than a predetermined signal quality threshold; time length for which the user equipment performs data transmission with the non-deactivated base station is longer than a predetermined time length threshold; the non-deactivated base station is to share load for the deactivated base station; power consumption that the user equipment performs uplink transmission with a single node is less than power consumption that the user equipment performs uplink transmission with dual nodes by a predetermined power consumption threshold; when the user equipment needs to transfer the wireless data connection with the deactivated base station to a new wireless base station, it needs to combine a procedure to establish wireless data connection with the new wireless base station and the non-deactivated base station with a procedure to release the wireless data connection with the deactivated base station; wireless link failure occurs between the user equipment and the deactivated base station; and the user equipment needs to establish wireless data connection with the deactivated base station at the same time in a scene that the user equipment only has wireless data connection with the non-deactivated base station, but an initial access procedure with respect to the deactivated base station by the user equipment fails.

According to another preferred embodiment of the disclosure, the deactivated base station or the non-deactivated base station sends one or more of the following to a core network: information about the non-deactivated base station, information about the deactivated base station, information about core network bearers corresponding to accepted data bearers and unaccepted data bearers, information about the deactivation condition, information about master-slave relationship between the non-deactivated base station and the deactivated base station and information about the user equipment.

According to another aspect of the disclosure, there is also provided a method for use in a wireless communication system, in which the wireless communication system includes a deactivated base station, a non-deactivated base station and a user equipment, and the user equipment simultaneously performs wireless data connections with the deactivated base station and the non-deactivated base station over different carriers, the method including: a deactivation judging step of judging whether a deactivation condition is satisfied by a deactivation triggering node; and a deactivation triggering step of triggering a deactivation procedure to release the wireless data connection between the deactivated base station and the user equipment by the deactivation triggering node if it is judged that the deactivation condition is satisfied.

According to another aspect of the disclosure, there is also provided a base station in a wireless communication system, in which a user equipment simultaneously performs wireless data connections with the base station and other base station over different carriers, and the base station releases the wireless data connection with the user equipment if a deactivation triggering node judges a deactivation condition is satisfied, the base station including: a receiving unit configured to receive notification information to release the wireless data connection between the base station and the user equipment; and a control unit configured to release, according to a result of admission control performed by the other base station included in the notification information, unaccepted data bearers among data bearers between the user equipment and the base station and transfer accepted data bearers among the data bearers to the other base station for transmission.

According to another aspect of the disclosure, there is also provided a base station in a wireless communication system, in which the user equipment simultaneously performs wireless data connections with the base station and other base station over different carriers, and the other base station releases the wireless data connection with the user equipment if a deactivation triggering node judges a deactivation condition is satisfied, the base station including: an admission control performing unit configured to perform admission control to determine acceptable data bearers and unacceptable data bearers among data bearers between the other base station and the user equipment.

According to another aspect of the disclosure, there is also provided a user equipment in a wireless communication system, in which the user equipment simultaneously performs wireless data connections with a deactivated base station and a non-deactivated base station over different carriers, the user equipment including: a control unit configured to trigger, if a deactivation triggering node judges a deactivation condition is satisfied, the user equipment to release the wireless data connection with the deactivated base station.

According to another aspect of the disclosure, there is also provided a device in a wireless communication system, in which the wireless communication system includes a deactivated base station, a non-deactivated base station and a user equipment, the user equipment simultaneously performs wireless data connections with the deactivated base station and the non-deactivated base station over different carriers, and a deactivation triggering node triggers a deactivation procedure to release the wireless data connection between the deactivated base station and the user equipment if it is judged that a deactivation condition is satisfied, the device including: a receiving unit configured to receive one or more of the following from the deactivated base station or the non-deactivated base station: information about the non-deactivated base station, information about the deactivated base station, information about core network bearers corresponding to accepted data bearers and unaccepted data bearers, information about the deactivation condition, information about master-slave relationship between the non-deactivated base station and the deactivated base station and information about the user equipment.

According to yet another aspect of the disclosure, there is also provided a storage medium including machine readable program codes which when executed on an information processing apparatus, cause the information processing apparatus to perform the following steps: a deactivation judging step of judging whether a deactivation condition is satisfied by a deactivation triggering node; and a deactivation triggering step of triggering a deactivation procedure to release wireless data connection between a deactivated base station and a user equipment by the deactivation triggering node if it is judged that the deactivation condition is satisfied, in which the user equipment simultaneously performs wireless data connections with the deactivated base station and a non-deactivated base station over different carriers.

According to another aspect of the disclosure, there is also provided a program product including machine executable instructions which when executed on an information processing apparatus cause the information processing apparatus to perform the following steps: a deactivation judging step of judging whether a deactivation condition is satisfied by a deactivation triggering node; and a deactivation triggering step of triggering a deactivation procedure to release wireless data connection between a deactivated base station and a user equipment by the deactivation triggering node if it is judged that the deactivation condition is satisfied, in which the user equipment simultaneously performs wireless data connections with the deactivated base station and a non-deactivated base station over different carriers.

Other aspects of the embodiments of the disclosure will be presented in the following detailed description serving to fully disclose preferred embodiments of the disclosure but not to limit the disclosure.

BRIEF DESCRIPTION OF THE DRAWINGS

The disclosure can be better understood with reference to the detailed description given below in conjunction with the accompanying drawings, throughout which identical or like reference signs denote identical or like components. The accompanying drawings together with the following detailed description are incorporated into and form a part of the specification and serve to further illustrate the preferred embodiments of the disclosure and to explain the principle and advantages of the disclosure by way of example. In the drawings.

DETAILED DESCRIPTION OF THE INVENTION

Figure 1:
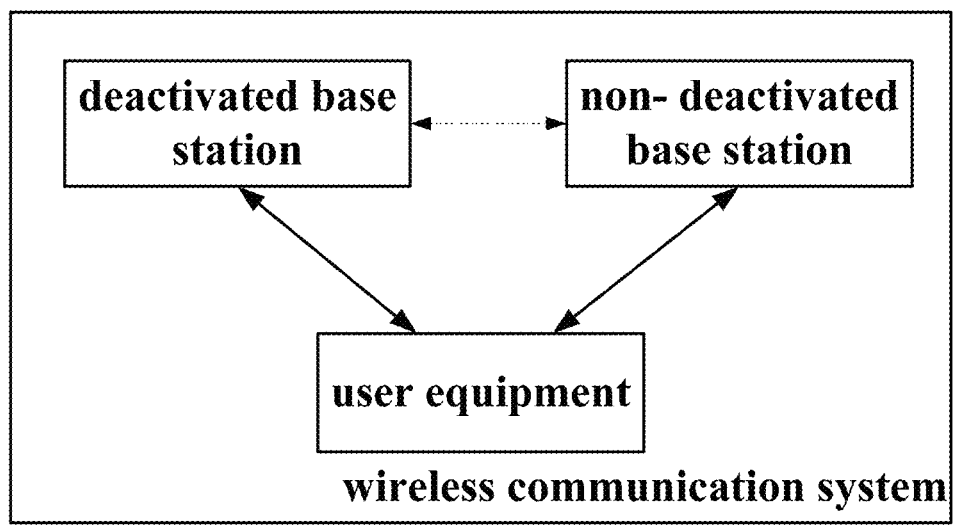
FIG. 1 is a schematic block diagram illustrating a wireless communication system according to an embodiment of the disclosure.

Exemplary embodiments of the present disclosure will be described below in conjunction with the accompanying drawings. For the sake of clarity and conciseness, not all the features of practical implementations are described in the specification. However, it is to be appreciated that numerous implementation-specific decisions shall be made during developing any of such practical implementations so as to achieve the developer's specific goals, for example, to comply with system- and business-related constraining conditions which will vary from one implementation to another. Moreover, it shall also be appreciated that such a development effort might be very complex and time-consuming but may simply be a routine task for those skilled in the art benefiting from this disclosure.

It shall further be noted that only those device structures and/or process steps closely relevant to the solutions of the disclosure are illustrated in the drawings while other details less relevant to the disclosure are omitted so as not to obscure the disclosure due to those unnecessary details.

Further, in order to facilitate description, hereinafter, a base station that the user equipment is to release the wireless data connection therewith is referred to as a "deactivated base station", while a base station that the user equipment maintains the wireless data connection therewith is referred to as a "non-deactivated base station", a node for triggering the deactivation procedure between the user equipment and the deactivated base station is referred to as a "deactivation triggering node", and a procedure to release the wireless data connection between the user equipment and the deactivated base station is referred to as a "deactivation procedure".

Embodiments of the disclosure will be described with reference to FIGS. 1-25 below. First, an example of a wireless communication system according to an embodiment of the disclosure will be described with reference to FIG. 1. FIG. 1 is a schematic block diagram illustrating a wireless communication system according to an embodiment of the disclosure.

As shown in FIG. 1, the wireless communication system may include the deactivated base station, the non-deactivated base station and the user equipment. In the wireless communication system, the user equipment simultaneously performs wireless data connections with the deactivated base station and the non-deactivated base station over different carriers, and the deactivation triggering node triggers, if it is judged that a deactivation condition is satisfied, the deactivation procedure to release the wireless data connection between the deactivated base station and the user equipment. Preferably, the deactivation triggering node may be the user equipment, the deactivated base station or the non-deactivated base station.

Preferably, as an example but not limitation, the deactivation condition may include at least one of the following: a primary carrier signal quality between the user equipment and the deactivated base station is lower than a predetermined signal quality threshold; time length for which the user equipment performs data transmission with the non-deactivated base station is longer than a predetermined time length threshold; the non-deactivated base station is to share load for the deactivated base station; power consumption that the user equipment performs uplink transmission with a single node is less than power consumption that the user equipment performs uplink transmission with dual nodes by a predetermined power consumption threshold; when the user equipment needs to transfer the wireless data connection with the deactivated base station to a new wireless base station, it needs to combine a procedure to establish wireless data connection with the new wireless base station and the non-deactivated base station with a procedure to release the wireless data connection with the deactivated base station; wireless link failure occurs between the user equipment and the deactivated base station; and the user equipment needs to establish wireless data connection with the deactivated base station at the same time in a scene that the user equipment only has wireless data connection with the non-deactivated base station, but an initial access procedure with respect to the deactivated base station by the user equipment fails.

Below, example scenes of the deactivation procedure between the user equipment and the deactivated base station in cases that the deactivation triggering node is the user equipment, the deactivated base station or the non-deactivated base station respectively will be described in detail with reference to FIGS. 2-8. Further, it is to be noted that in order to avoid the drawings and the description being too complex, only signaling interactions closely related to the deactivation procedure are shown and described herein, and those signaling interactions which are well-known to those skilled in the art will not be described herein.

First, example scenes of the deactivation procedure between the user equipment and the deactivated base station in a case that the user equipment serves as the deactivation triggering node will be described with reference to FIGS. 2-4.

Specifically, if the deactivation triggering node is the user equipment, in a case that the deactivation condition is satisfied, the user equipment issues a notification to the non-deactivated base station to trigger the deactivation procedure, the non-deactivated base station performs admission control, and the deactivated base station releases, upon being informed of the non-deactivated base station having performed the admission control, unaccepted data bearers among data bearers between the user equipment and the deactivated base station and transfers accepted data bearers among the data bearers to the non-deactivated base station for transmission.

Figure 2:
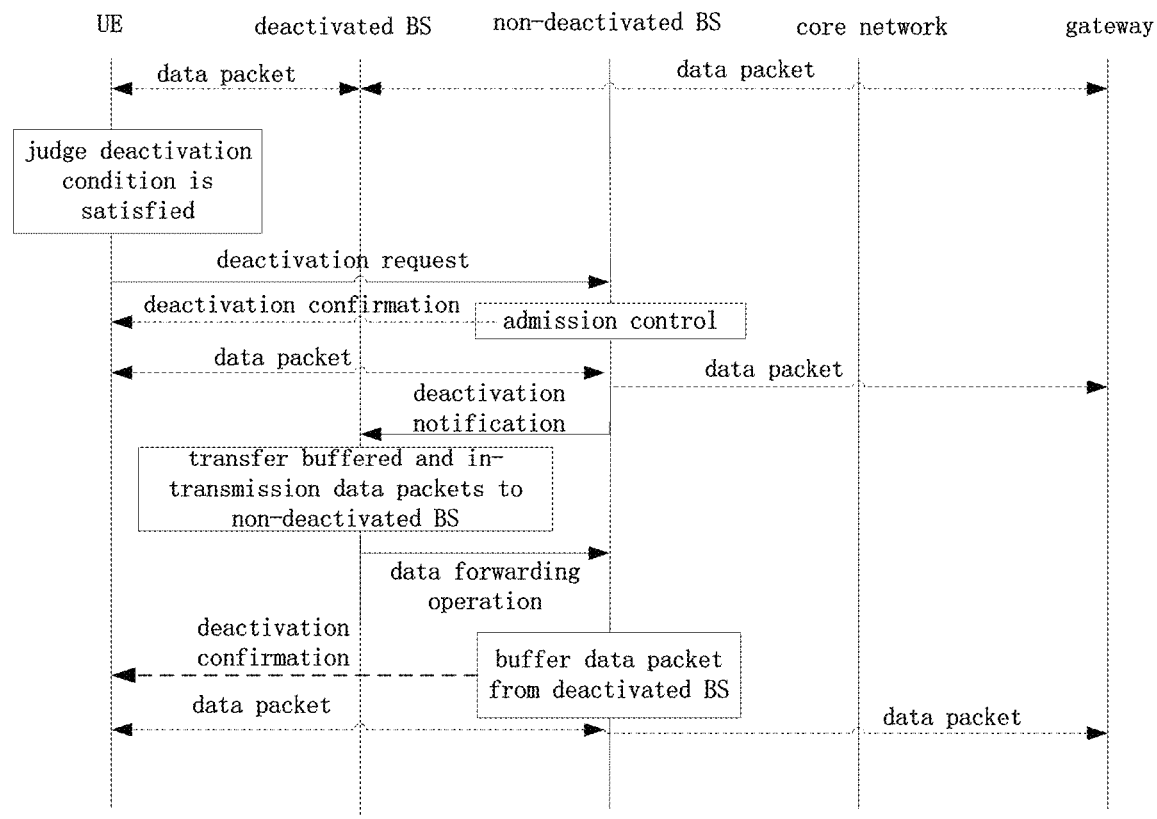
FIG. 2 is a schematic diagram illustrating an example scene of a deactivation procedure between the user equipment and the deactivated base station in a case that the user equipment serves as the deactivation triggering node.

FIG. 2 is a schematic diagram illustrating an example scene of the deactivation procedure between the user equipment and the deactivated base station in a case that the user equipment serves as the deactivation triggering node. This example scene generally applies to the following two cases: first, wireless link failure occurs between the user equipment and the deactivated base station; and second, in a scene where the user equipment only has wireless data connection with the non-deactivated base station, the user equipment needs to establish the wireless data connection with the deactivated base station at the same, but an initial access procedure with respect to the deactivated base station by the user equipment fails.

As shown in FIG. 2, the user equipment serving as the deactivation triggering node issues, in a case that it monitors the deactivation triggering condition is satisfied, a "deactivation request" to the non-deactivated base station for example to report such a case, thereby triggering the deactivation procedure between the user equipment and the deactivated base station. Then, the non-deactivated base station performs the admission control to determine acceptable data bearers and unacceptable data bearers for the non-deactivated base station among the data bearers between the user equipment and the deactivated base station, and issues for example a "deactivation notification" to the deactivated base station to notify the deactivated base station of the result of the admission control. The deactivated base station stops scheduling of data bearers relevant to the user equipment after receiving the notification, releases the unacceptable data bearers for the non-deactivated base station and transfers the acceptable data bearers for the non-deactivated base station to the non-deactivated base station. It should note that after receiving the "deactivation notification", the deactivated base station may feed back an acknowledgement message to the notification, and may also not feed back the acknowledgement message of course.

Further, the non-deactivated base station may issue, after performing the admission control or after confirming the deactivated base station has performed data bearer transfer operation, a "deactivation confirmation" to the user equipment for example to notify the user equipment to release the unacceptable data bearers. It should note that the "deactivation confirmation" can be performed only once after the admission control or after confirming the deactivated base station has performed the data bearer transfer operation.

Preferably, the user equipment releases, after monitoring the wireless link failure or receiving the "deactivation confirmation" message, RRC (radio resource control) configuration of the deactivated base station but reserves data bearer information about the deactivated base station in order to update transmitting and receiving nodes of relevant data bearers after the deactivation procedure. The deactivated base station releases all RRC configuration information and data bearer information between itself and the user equipment after completing the data bearer transfer operation.

Next, another example scene of the deactivation procedure between the user equipment and the deactivated base station in a case that the user equipment serves as the deactivation triggering node will be described with reference to FIG. 3. FIG. 3 is a schematic diagram illustrating another example scene of the deactivation procedure between the user equipment and the deactivated base station in a case that the user equipment serves as the deactivation triggering node. This scene generally applies to other cases than the triggering conditions of FIG. 2.

Figure 3:
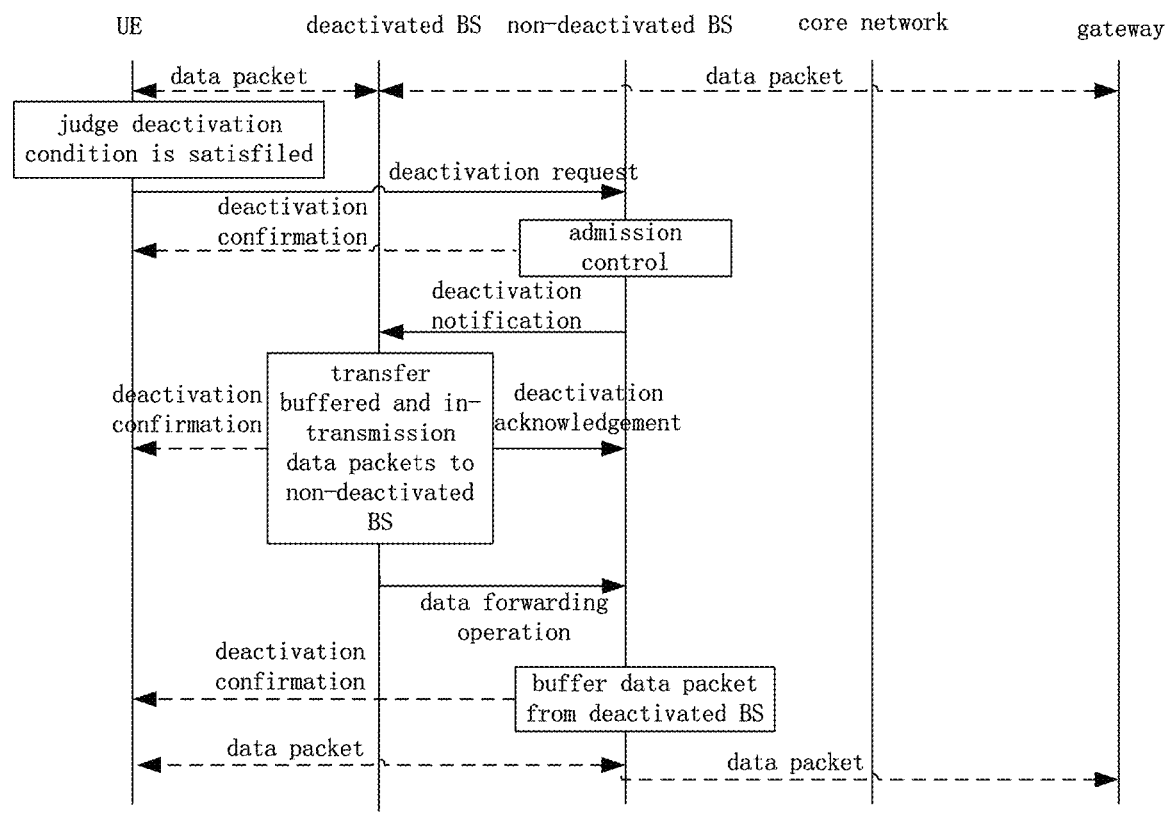
FIG. 3 is a schematic diagram illustrating another example scene of the deactivation procedure between the user equipment and the deactivated base station in a case that the user equipment serves as the deactivation triggering node.

As shown in FIG. 3, in a case that the user equipment serving as the deactivation triggering node judges the deactivation condition is satisfied, the user equipment issues for example a "deactivation request" to the non-deactivated base station to trigger the deactivation procedure between the user equipment and the deactivated base station. The non-deactivated base station performs the admission control after receiving the request, and then issues for example a "deactivation notification" to the deactivated base station to notify the deactivated base station of the result of the admission control, thereby triggering the deactivated base station to release the unacceptable data bearers and transfer the acceptable data bearers to the non-deactivated base station. Further, after the admission control, for example, a "deactivation confirmation" is also issued to the user equipment to notify the user equipment of the result of the admission control.

As shown in FIG. 3, in this case, for example, the "deactivation confirmation" may be issued to the user equipment at the following three moments as a feedback to the "deactivation request" issued by the user equipment, so as to notify the user equipment of the acceptable data bearers and unacceptable data bearers for the non-deactivated base station: (1) after the non-deactivated base station has performed the admission control, the "deactivation confirmation" is issued by the non-deactivated base station to the user equipment; (2) after the deactivated base station has received the "deactivation notification", the "deactivation confirmation" is issued by the deactivated base station to the user equipment; and (3) after the deactivated base station has performed the data bearer transfer operation, the "deactivation confirmation" is issued by the non-deactivated base station to the user equipment. The user equipment switches the transmitting and receiving nodes of the acceptable data bearers and releases the unacceptable data bearers after receiving the confirmation message.

As can be seen from above, as compared with the scene shown in FIG. 2, in the scene shown in FIG. 3, since the user equipment may communicate with the deactivated base station, it is possible to issue by the deactivated base station the confirmation to for example the "deactivation request" to the user equipment.

Next, yet another example scene of the deactivation procedure in a case that the user equipment serves as the deactivation triggering node will be described with reference to FIG. 4. FIG. 4 is a schematic diagram illustrating yet another example scene of the deactivation procedure between the user equipment and the deactivated base station in a case that the user equipment serves as the deactivation triggering node.

Figure 4:
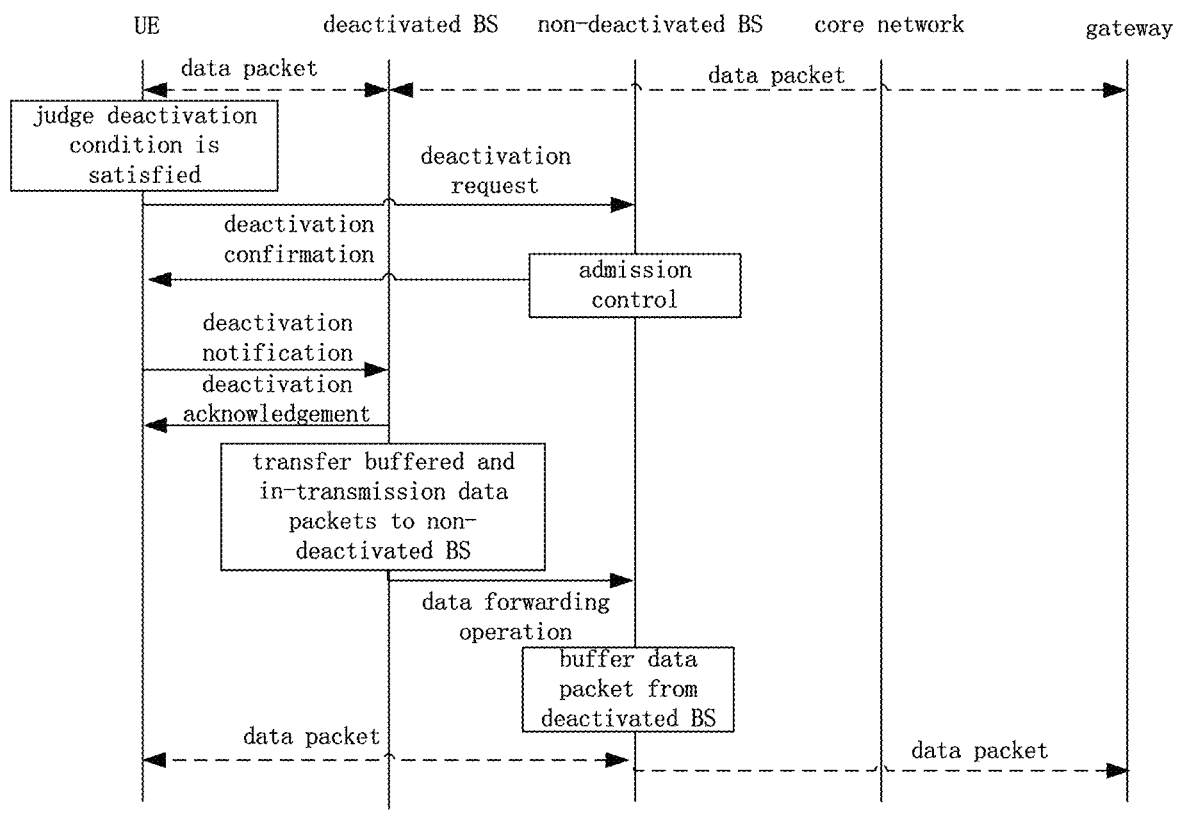
FIG. 4 is a schematic diagram illustrating yet another example scene of the deactivation procedure between the user equipment and the deactivated base station in a case that the user equipment serves as the deactivation triggering node.

As shown in FIG. 4, the processing flow before the admission control of the non-deactivated base station is the same as that in FIG. 3, and thus no description will be repeated herein. Only cases different from those in the scene shown in FIG. 3 will be described below.

Specifically, the non-deactivated base station issues, after performing the admission control, the "deactivation confirmation" to the user equipment as the feedback to the "deactivation request" for example, so as to confirm the acceptable data bearers and unacceptable data bearers for the non-deactivated base station. Then, the user equipment issues for example the "deactivation notification" to the deactivated base station to trigger the deactivated base station to release the unacceptable data bearers and transfer the acceptable data bearers to the non-deactivated base station according to the admission control result. It should understand that after receiving the notification message from the user equipment, the deactivated base station may feed back an acknowledgement to the message and may also not, and the disclosure make no limitation on this.

Example scenes of the deactivation procedure between the user equipment and the deactivated base station in a case that the deactivated base station serves as the deactivation triggering node will be described in detail with reference to FIGS. 5 and 6 below.

Specifically, if the deactivation triggering node is the deactivated base station, the non-deactivated base station performs admission control and issues a notification to the deactivated base station after receiving a message for triggering the deactivation procedure issued by the deactivated base station, and the deactivated base station releases, according to the notification from the non-deactivated base station, unaccepted data bearers among data bearers between the user equipment and the deactivated base station and transfers accepted data bearers among the data bearers to the non-deactivated base station.

First, description will be made with reference to FIG. 5. FIG. 5 is a schematic diagram illustrating an example scene of the deactivation procedure between the user equipment and the deactivated base station in a case that the deactivated base station serves as the deactivation triggering node.

Figure 5:
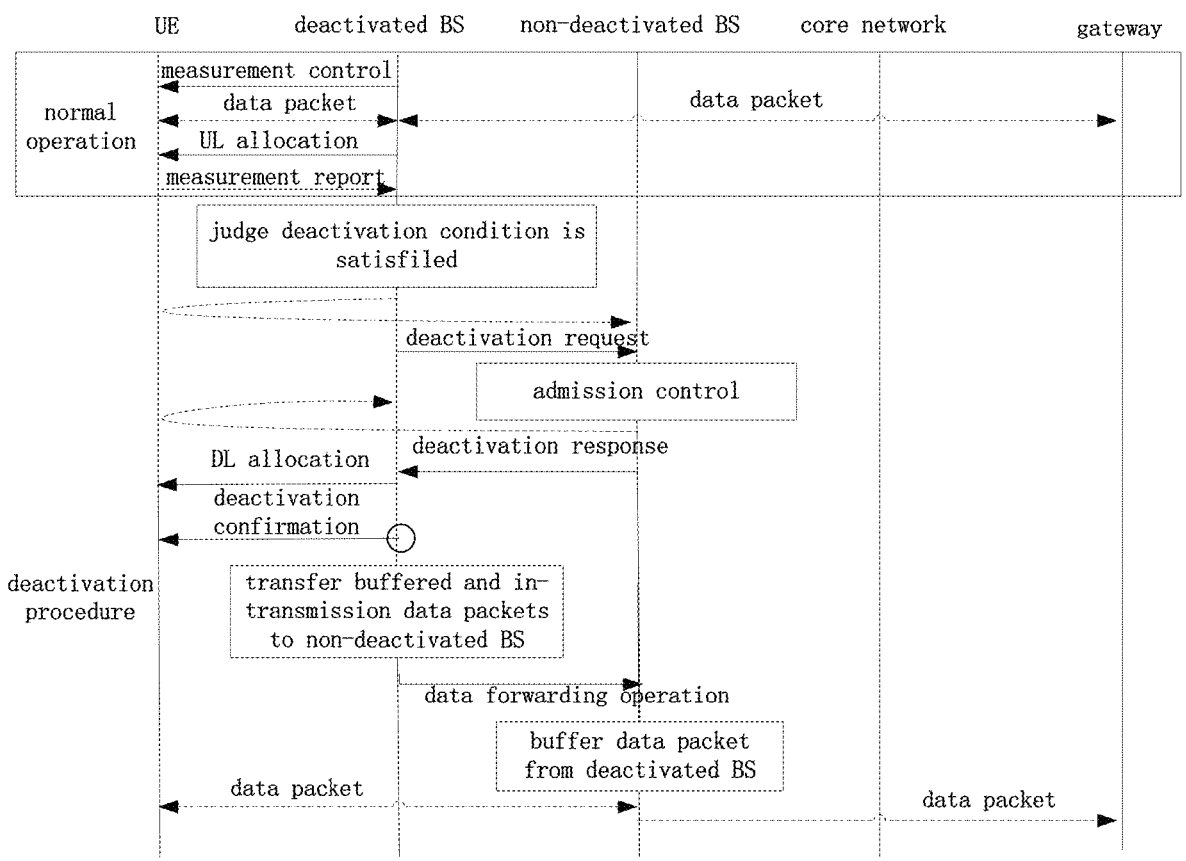
FIG. 5 is a schematic diagram illustrating an example scene of the deactivation procedure between the user equipment and the deactivated base station in a case that the deactivated base station serves as the deactivation triggering node.

As shown in FIG. 5, the deactivated base station serving as the deactivation triggering node issues, after it is judged the deactivation condition is satisfied, the "deactivation request" to the non-deactivated base station for example to trigger the deactivation procedure. The non-deactivated base station performs the admission control after receiving the request, and then issues, according to the result of the admission control, a "deactivation response" to the deactivated base station for example as a feedback to the "deactivation request", so as to confirm whether to accept the deactivation procedure. The deactivated base station releases, according to the received response message, the unacceptable data bearers for the non-deactivated base station and transfers the acceptable data bearers to the non-deactivated base station. Further, the deactivated base station issues, after receiving the response message, the "deactivation confirmation" to the user equipment for example to notify the user equipment of the acceptable data bearers and unacceptable data bearers for the non-deactivated base station. It should understand that in a case that the "deactivation response" indicates that the deactivation procedure can not be accepted, there is no need to perform subsequent operations.

Figure 6:
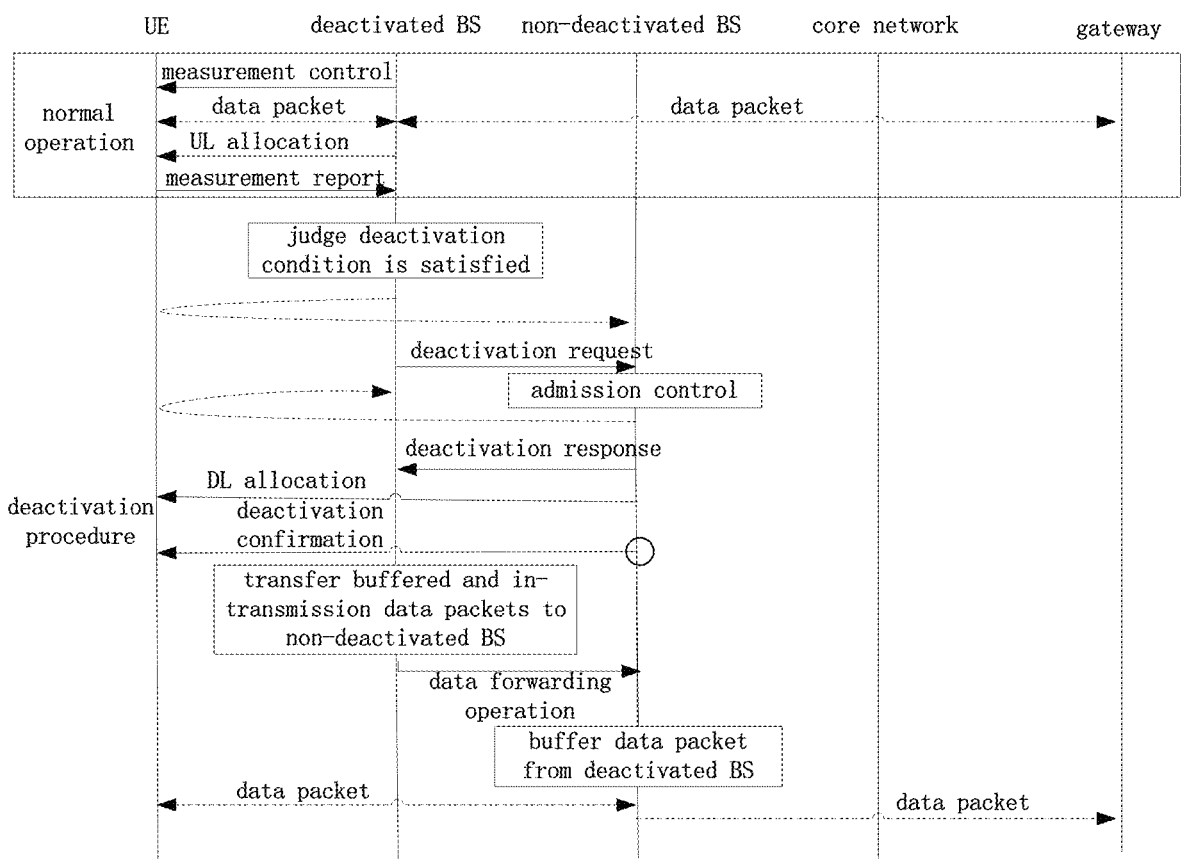
FIG. 6 is a schematic diagram illustrating another example scene of the deactivation procedure between the user equipment and the deactivated base station in a case that the deactivated base station serves as the deactivation triggering node.

FIG. 6 is a schematic diagram illustrating another example scene of the deactivation procedure between the user equipment and the deactivated base station in a case that the deactivated base station serves as the deactivation triggering node. As can be seen from FIG. 6, the only difference from the example scene as shown in FIG. 5 is that the "deactivation confirmation" is issued to the user equipment by the non-deactivated base station, as denoted by circles in FIGS. 5 and 6, and thus no description for the deactivation procedure as shown in FIG. 6 will be repeated herein.

However, it should note that in a case where both the "deactivation request" issued by the deactivated base station and the "deactivation response" fed back by the non-deactivated base station are transmitted through an air interface, as shown by broken lines in FIGS. 5 and 6, there is no need to send the "deactivation confirmation" to the user equipment, and the user equipment may parse the received "deactivation response" to determine the data bearers to be released and the data bearers for which the transmitting and receiving nodes shall be switched. In this case, there is no difference between the example scenes as shown in FIGS. 5 and 6, and the example scenes can be combined into one.

Next, example scenes of the deactivation procedure in a case that the non-deactivated base station serves as the deactivation triggering node will be described with reference to FIGS. 7 and 8.

Specifically, if the deactivation triggering node is the non-deactivated base station, the non-deactivated base station performs admission control directly after deciding to trigger the deactivation procedure and issues a notification to the deactivated base station, and the deactivated base station releases, according to the notification from the non-deactivated base station, unaccepted data bearers among data bearers between the user equipment and the deactivated base station and transfers accepted data bearers among the data bearers to the non-deactivated base station.

Figure 7:
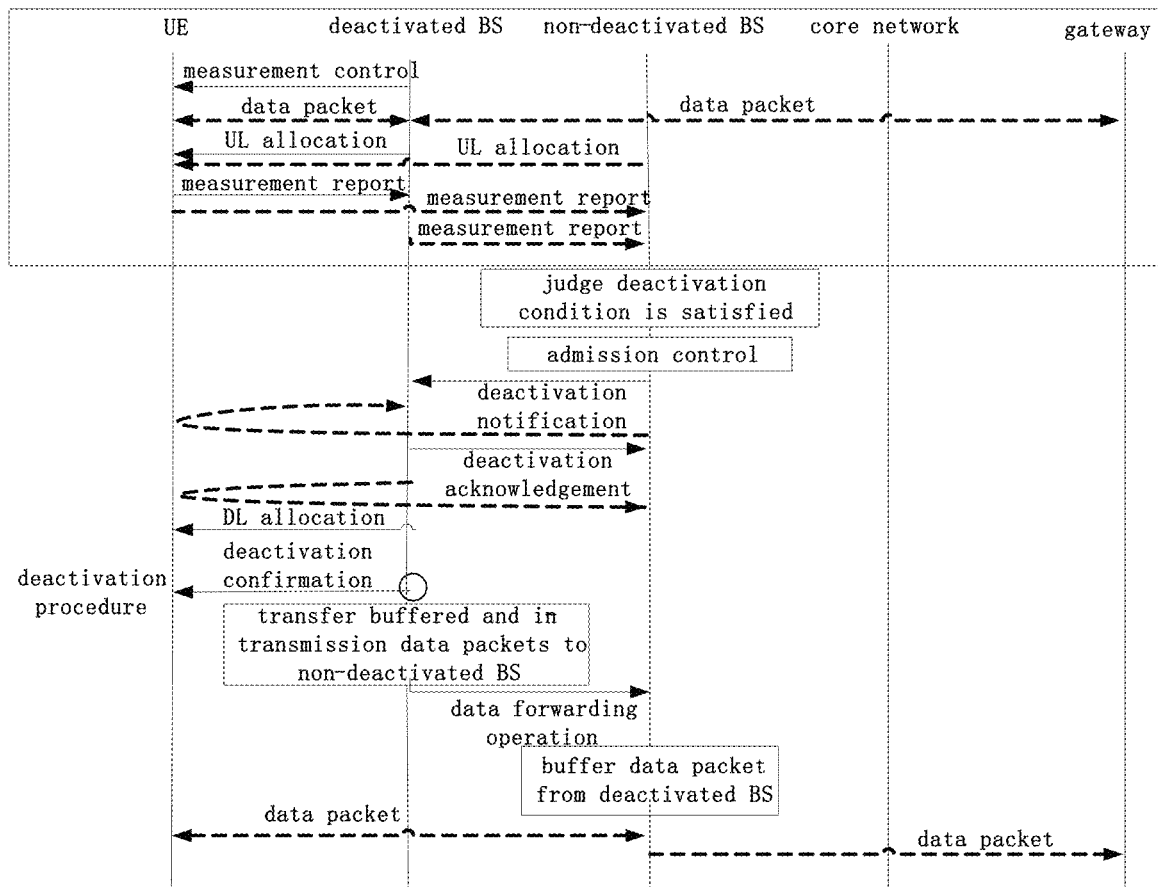
FIG. 7 is a schematic diagram illustrating an example scene of the deactivation procedure between the user equipment and the deactivated base station in a case that the non-deactivated base station serves as the deactivation triggering node.

First, reference is made to FIG. 7, which is a schematic diagram illustrating an example scene of the deactivation procedure between the user equipment and the deactivated base station in a case that the non-deactivated base station serves as the deactivation triggering node.

As shown in FIG. 7, the non-deactivated base station serving as the deactivation triggering node performs the admission control after it is judged that the deactivation condition is satisfied and then issues for example the "deactivation notification" to the deactivated base station so as to notify the deactivated base station of the result of the admission control, and the deactivated base station returns, after receiving the notification message, a "deactivation acknowledgement" to the non-deactivated base station for example as a feedback to the "deactivation notification" so as to determine whether to accept the deactivation procedure. It should understand that in a case that a decision right of the deactivation procedure belongs to the non-deactivated base station in default, the sending of the "deactivation acknowledgement" may be omitted. The deactivated base station releases, according to the received "deactivation notification", the unacceptable data bearers for the non-deactivated base station and transfers the acceptable data bearers to the non-deactivated base station. Further, after receiving the "deactivation notification", the deactivated base station further issues for example the "deactivation confirmation" to the user equipment so as to notify the user equipment of the data bearers to be released and the data bearers for which the transmitting and receiving nodes shall be switched.

Further, preferably, since the non-deactivated base station serves as the deactivation triggering node for triggering the deactivation procedure, the user equipment needs to report a mobility measurement result of a carrier of the deactivated base station to the non-deactivated base station and the deactivated base station. As shown in FIG. 7, the user equipment may directly report the mobility measurement result to the non-deactivated base station, or in a case that the user equipment only reports the mobility measurement result to the deactivated base station, the result may be reported to the non-deactivated base station via the deactivated base station to serve as a reference for triggering the deactivation procedure by the non-deactivated base station.

Figure 8:
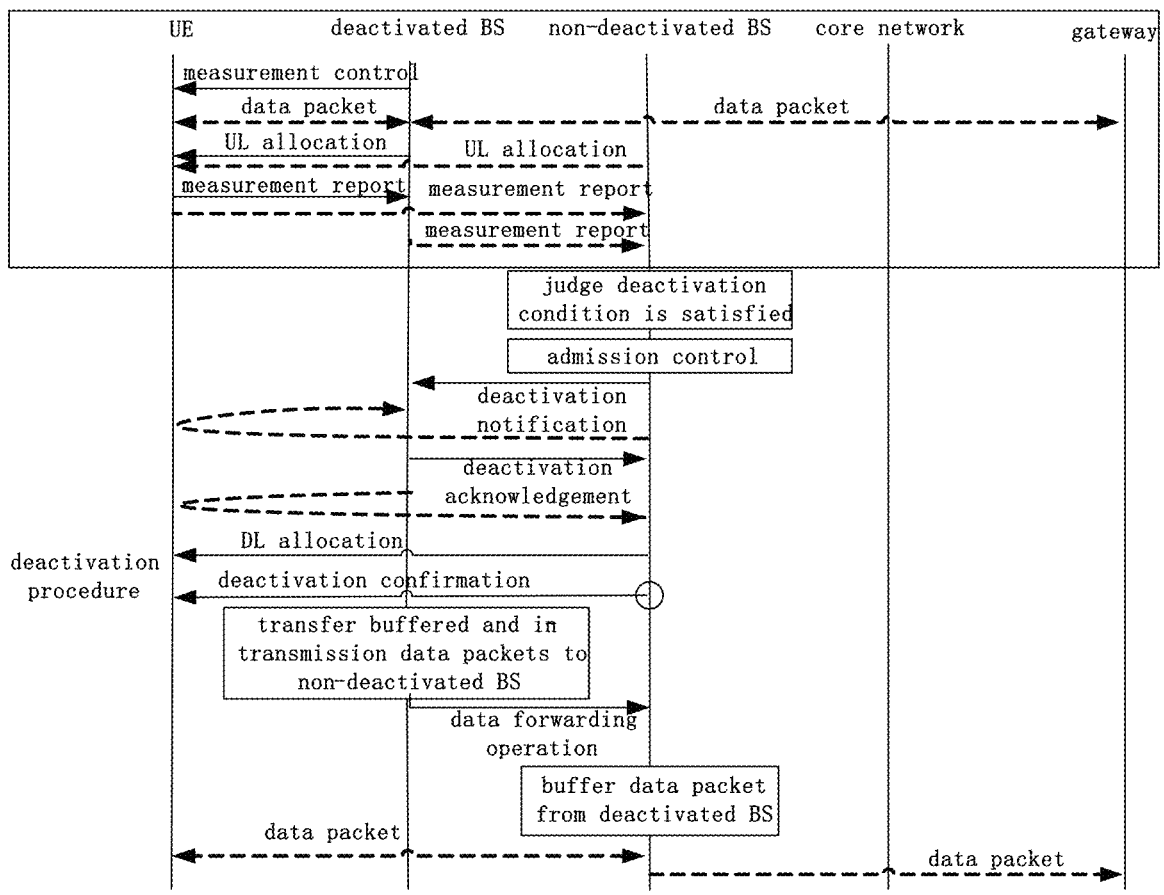
FIG. 8 is a schematic diagram illustrating another example scene of the deactivation procedure between the user equipment and the deactivated base station in a case that the non-deactivated base station serves as the deactivation triggering node.

FIG. 8 is a schematic diagram illustrating another example scene of the deactivation procedure between the user equipment and the deactivated base station in a case that the non-deactivated base station serves as the deactivation triggering node. As can be seen from FIG. 8, the only difference from the example scene as shown in FIG. 7 is that the "deactivation confirmation" is issued to the user equipment by the non-deactivated base station, as denoted by circles in FIGS. 7 and 8, and thus no description of the deactivation procedure as shown in FIG. 8 will be repeated herein.

However, it should note that in a case that both the "deactivation notification" issued by the non-deactivated base station and the "deactivation acknowledgement" fed back by the deactivated base station are transmitted via the air interface, as shown by broken lines in FIGS. 7 and 8, there is no need to send the "deactivation confirmation" to the user equipment, and the user equipment may parse the received "deactivation notification" to determine the data bearers to be released and the data bearers for which the transmitting and receiving nodes shall be switched. In this case, there is no difference between the example scenes as shown in FIGS. 7 and 8, and thus the example scenes can be combined into one.

According to the deactivation procedure described above with reference to FIGS. 2-8, the user equipment releases, upon being informed of the non-deactivated base station having performed the admission control, the unacceptable data bearers for the non-deactivated base station and transmits and receives the acceptable data bearers over a service carrier of the non-deactivated base station. Specifically, the user equipment may obtain confirmation information related to the deactivation procedure from the deactivated base station or the non-deactivated base station, the confirmation information including a result that the non-deactivated base station has performed the admission control, and the user equipment releases, according to the result of the admission control, the unacceptable data bearers and transmits and receives the acceptable data bearers over a service carrier of the non-deactivated base station.

Further, preferably, the non-deactivated base station notifies a core network to release core network bearers corresponding to the unaccepted data bearers after completing the admission control, or the deactivated base station notifies the core network to release core network bearers corresponding to the unaccepted data bearers after receiving a notification about the deactivation procedure from the non-deactivated base station.

Further, preferably, after determining the deactivation procedure can be accepted, the deactivated base station or the non-deactivated base station sends one or more of the following to the core network: information about the non-deactivated base station, information about the deactivated base station, information about core network bearers corresponding to accepted data bearers and unaccepted data bearers, information about the deactivation condition, information about master-slave relationship between the non-deactivated base station and the deactivated base station and information about the user equipment.

Further, the above FIGS. 2-8 only reflect the situation in which the data of the deactivated base station is directly transmitted from the core network, if the data of the deactivated base station is directly forwarded from the non-deactivated base station, the non-deactivated base station stops continuing to forward data to the deactivated base station while performing the admission control; otherwise, the core network triggers path transfer operation for core network bearers corresponding to the accepted data bearers after receiving a notification about the deactivation procedure, which is issued by the non-deactivated base station after completing the admission control.

Further, during the procedure of transferring the acceptable data bearers from the deactivated base station to the non-deactivated base station, service bearers of uplink unacknowledgement (UM) transmission mode (such as service bearers sensitive to time delay but insensitive to packet loss, e.g., VoIP or the like) only need to adjust the transmission target nodes of the terminal, while other service bearers need to perform synchronized operations of the data bearer transfer and PDCP and adjustment operation of the target transmitting and receiving nodes.

Although examples of the wireless communication system and the deactivation procedure between the user equipment and the deactivated base station in the wireless communication system according to the embodiments of the disclosure have been described above with reference to FIGS. 1-8, it should understand that the above description is only an example but not limitation, and those skilled in the art may modify the above examples according to an principle of the disclosure.

Figure 9:
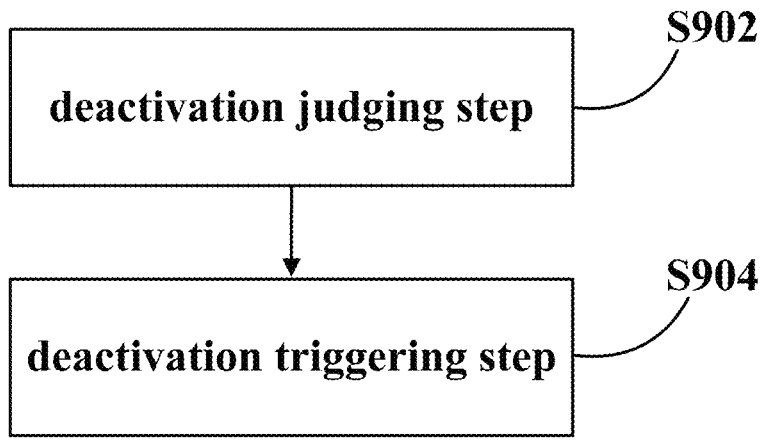
FIG. 9 is a schematic flow chart illustrating a method for use in the wireless communication system according to an embodiment of the disclosure.

Next, a method for use in a wireless communication system according to an embodiment of the disclosure will be described with reference to FIG. 9. FIG. 9 is a schematic flow chart illustrating a method for use in a wireless communication system according to an embodiment of the disclosure.

As shown in FIG. 9, the method 900 according to the embodiment of the disclosure may include a deactivation judging step S902 and a deactivation triggering step S904. The wireless communication system using the method 900 includes the deactivated base station, the non-deactivated base station and the user equipment, and the user equipment simultaneously performs wireless data connections with the deactivated base station and the non-deactivated base station over different carriers.

First, in the deactivation judging step S902, the deactivation triggering node judges whether the deactivation condition is satisfied. Preferably, as described above in the wireless communication system, the deactivation triggering node may be the deactivated base station, the non-deactivated base station or the user equipment.

Then, in the deactivation triggering step S904, in a case that it is judged the deactivation condition is satisfied, the deactivation triggering node triggers the deactivation procedure for releasing the wireless data connection between the deactivated base station and the user equipment.

The specific deactivation procedure may be referred to the description made above with reference to FIGS. 2-8, and thus no description will be repeated herein.

Figure 10:
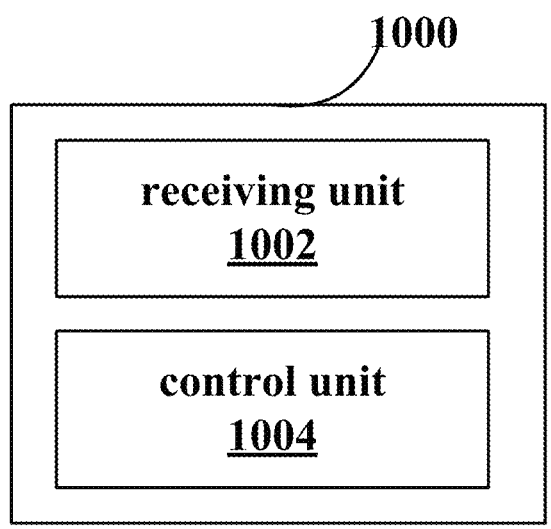
FIG. 10 is a block diagram illustrating an example of functional configuration of a base station in a wireless communication system according to an embodiment of the disclosure.

An example of functional configuration of a base station in a wireless communication system according to an embodiment of the disclosure will be described with reference to FIG. 10 below. FIG. 10 is a block diagram illustrating an example of functional configuration of a base station in a wireless communication system according to an embodiment of the disclosure.

In the wireless communication system, the user equipment simultaneously performs wireless data connections with the base station and other base station over different carriers, and the base station releases the wireless data connection with the user equipment in a case that the deactivation triggering node judges the deactivation condition is satisfied. It should understand that the base station in the embodiment is the deactivated base station, and the other base station is the non-deactivated base station.

As shown in FIG. 10, the base station 1000 may include a receiving unit 1002 and a control unit 1004.

The receiving unit 1002 may be configured to receive notification information to release the wireless data connection between the base station 1000 and the user equipment. As described above with reference to FIGS. 2-8, the notification information may be from the user equipment or the other base station, and the notification information may be for example the foregoing "deactivation notification" or "deactivation response".

The control unit 1004 may be configured to release, according to a result of admission control performed by the other base station included in the received notification information, unaccepted data bearers among data bearers between the user equipment and the base station 1000 and transfer accepted data bearers among the data bearers to the other base station.

Preferably, as an example but not limitation, the deactivation condition may include at least one of the following: a primary carrier signal quality between the user equipment and the base station 1000 is lower than a predetermined signal quality threshold; time length for which the user equipment performs data transmission with the other base station is longer than a predetermined time length threshold; the other base station is to share load for the base station 1000; power consumption that the user equipment performs uplink transmission with a single node is less than power consumption that the user equipment performs uplink transmission with dual nodes by a predetermined power consumption threshold; when the user equipment needs to transfer the wireless data connection with the base station 1000 to a new wireless base station, it needs to combine a procedure to establish wireless data connection with the new wireless base station and the other base station with a procedure to release the wireless data connection with the base station 1000; wireless link failure occurs between the user equipment and the base station 1000; and the user equipment needs to establish wireless data connection with the base station 1000 at the same time in a scene that the user equipment only has wireless data connection with the other base station, but an initial access procedure with respect to the base station 1000 by the user equipment fails.

Figure 11:
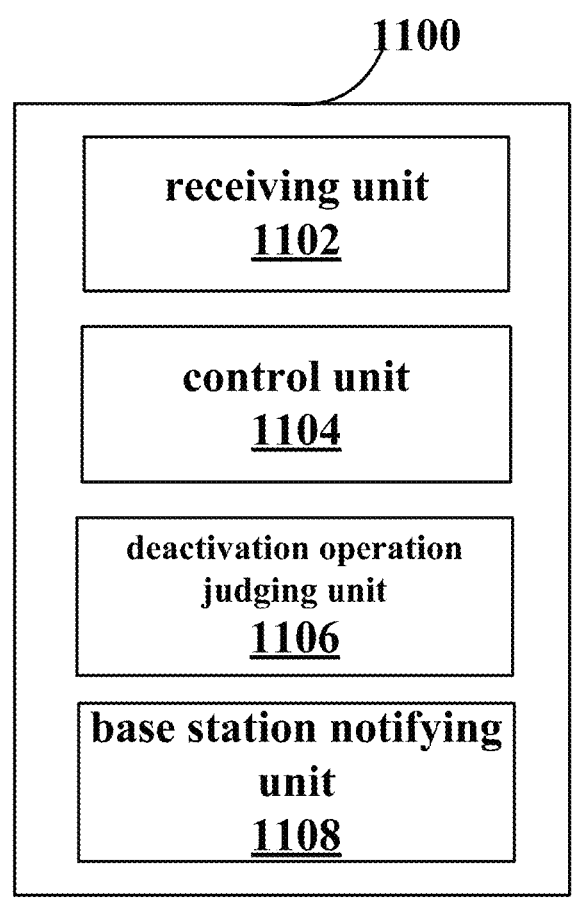
FIG. 11 is a block diagram illustrating an example of functional configuration of the base station in the wireless communication system according to another embodiment of the disclosure.

An example of functional configuration of the base station in the wireless communication system according to another embodiment of the disclosure will be described with reference to FIG. 11 below. FIG. 11 is a block diagram illustrating an example of functional configuration of the base station in the wireless communication system according to another embodiment of the disclosure.

As shown in FIG. 11, the base station 1100 according to another embodiment of the disclosure may include a receiving unit 1102, a control unit 1104, a deactivation operation judging unit 1106 and a base station notifying unit 1108. Particularly, the functional configurations of the receiving unit 1102 and the control unit 1104 are the same as those of the receiving unit 1002 and the control unit 1004 described above with reference to FIG. 10, and thus no details thereof will be described herein. Examples of the functional configurations of the deactivation operation judging unit 1106 and the base station notifying unit 1108 will be described in detail respectively below.

The deactivation operation judging unit 1106 may be configured to judge, if the base station 1100 is the deactivation triggering node, whether the deactivation condition is satisfied.

The base station notifying unit 1108 may be configured to notify, if the deactivation operation judging unit 1106 judges that the deactivation condition is satisfied, the other base station so as to request release of the wireless data connection between the base station 1100 and the user equipment.

Figure 12:
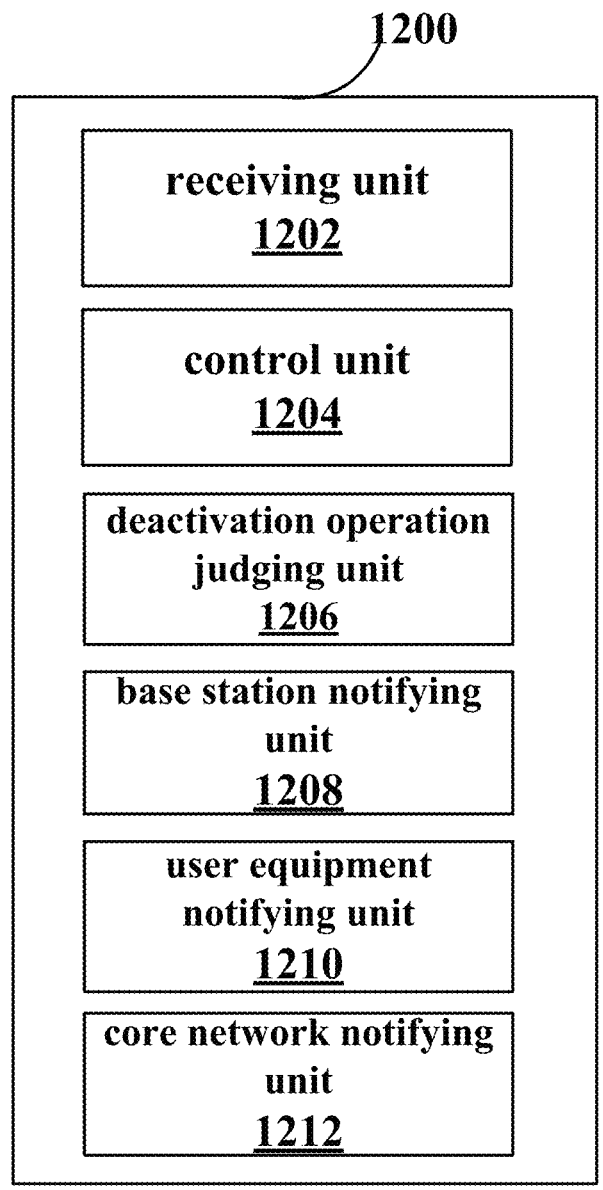
FIG. 12 is a block diagram illustrating an example of functional configuration of the base station in the wireless communication system according to yet another embodiment of the disclosure.

Next, an example of functional configuration of the base station in the wireless communication system according to yet another embodiment of the disclosure will be described with reference to FIG. 12. FIG. 12 is a block diagram illustrating an example of functional configuration of the base station in the wireless communication system according to yet another embodiment of the disclosure.

As shown in FIG. 12, the base station 1200 in the wireless communication system according to yet another embodiment of the disclosure may include a receiving unit 1202, a control unit 1204, a deactivation operation judging unit 1206, a base station notifying unit 1208, a user equipment notifying unit 1210 and a core network notifying unit 1212. Particularly, functional configurations of the receiving unit 1202, the control unit 1204, the deactivation operation judging unit 1206 and the base station notifying unit 1208 are the same as those of the receiving unit 1102, the control unit 1104, the deactivation operation judging unit 1106 and the base station notifying unit 1108 described above with reference to FIG. 11, and thus no details thereof will be described herein. Examples of functional configurations of the the user equipment notifying unit 1210 and the core network notifying unit 1212 will be described in detail respectively below.

The user equipment notifying unit 1210 may be configured to notify to the user equipment release of the wireless data connection between the user equipment and the base station 1200 and the result of the admission control.

The core network notifying unit 1212 may be configured to notify the core network to release the core network bearers corresponding to the unaccepted data bearers.

It should understand that the examples of the functional configurations of the base stations 1100 and 1200 described above with reference to FIGS. 11 and 12 correspond to the examples of scenes of the deactivation procedure in a case that the deactivated base station serves as the deactivation triggering node, that is, the examples of the scenes as shown in FIGS. 5 and 6.

Figure 13:
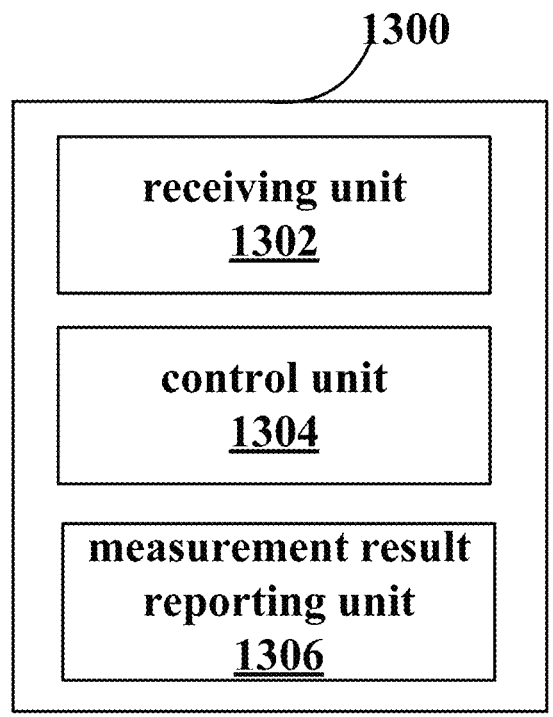
FIG. 13 is a block diagram illustrating an example of functional configuration of the base station in the wireless communication system according to still another embodiment of the disclosure.

An example of functional configuration of the base station in the wireless communication system according to still another embodiment of the disclosure will be described with reference to FIG. 13 below. FIG. 13 is a block diagram illustrating an example of functional configuration of the base station in the wireless communication system according to still another embodiment of the disclosure.

As shown in FIG. 13, the base station 1300 in the wireless communication system according to still another embodiment of the disclosure may include a receiving unit 1302, a control unit 1304 and a measurement result reporting unit 1306. Particularly, functional configurations of the receiving unit 1302 and the control unit 1304 are the same as those of the receiving unit 1002 and the control unit 1004 described above with reference to FIG. 10, and thus no details thereof will be repeated herein. Only an example of functional configuration of the measurement result reporting unit 1306 will be described in detail below.

The measurement result reporting unit 1306 may be configured to report, if the other base station is the deactivation triggering node and the user equipment only reports a mobility measurement result of a carrier of the base station 1300 to the base station 1300, the mobility measurement result to the other base station, and thus the other base station may judge whether the deactivation condition is satisfied according to the received mobility measurement result.

It is to be understood that the example of the functional configuration of the base station 1300 as shown in FIG. 13 corresponds to the example of the scene of the deactivation procedure in a case that the non-deactivated base station serves as the deactivation triggering node, that is, the examples of the scenes as shown in FIGS. 7 and 8.

Figure 14:
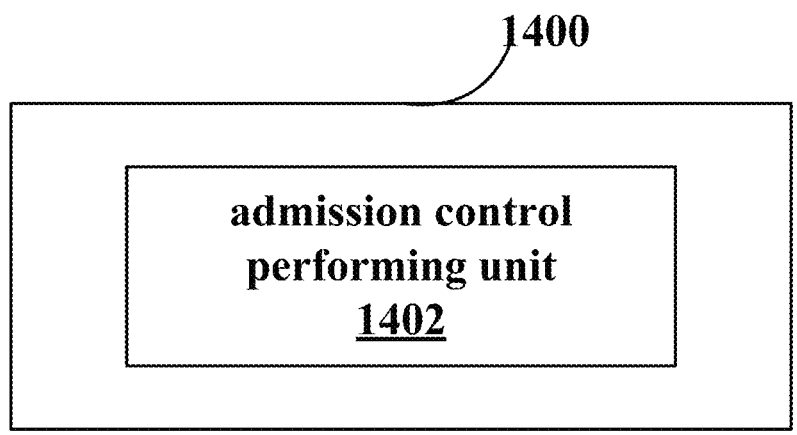
FIG. 14 is a block diagram illustrating an example of functional configuration of a base station in a wireless communication system according to an embodiment of the disclosure.

FIG. 14 is a block diagram illustrating an example of functional configuration of a base station in a wireless communication system according to an embodiment of the disclosure.

In the wireless communication system, the user equipment simultaneously performs wireless data connections with the base station and other base station over different carriers, and in a case that the deactivation triggering node judges the deactivation condition is satisfied, the other base station releases the wireless data connection with the user equipment. It is to be understood that in the embodiment, the base station is the non-deactivated base station, and the other base station is the deactivated base station.

As shown in FIG. 14, the base station 1400 according to the embodiment of the disclosure may include an admission control performing unit 1402.

The admission control performing unit 1402 may be configured to perform the admission control to determine the acceptable data bearers and unacceptable data bearers among the data bearers between the other base station and the user equipment.

Preferably, as an example but not limitation, the deactivation condition may include at least one of the following: a primary carrier signal quality between the user equipment and the other base station is lower than a predetermined signal quality threshold; time length for which the user equipment performs data transmission with the base station 1400 is longer than a predetermined time length threshold; the base station 1400 is to share load for the other base station; power consumption that the user equipment performs uplink transmission with a single node is less than power consumption that the user equipment performs uplink transmission with dual nodes by a predetermined power consumption threshold; when the user equipment needs to transfer the wireless data connection with the other base station to a new wireless base station, it needs to combine a procedure to establish wireless data connection with the new wireless base station and the base station 1400 with a procedure to release the wireless data connection with the other base station; wireless link failure occurs between the user equipment and the other base station; and the user equipment needs to establish wireless data connection with the other base station at the same time in a scene that the user equipment only has wireless data connection with the base station 1400, but an initial access procedure with respect to the other base station by the user equipment fails.

Figure 15:
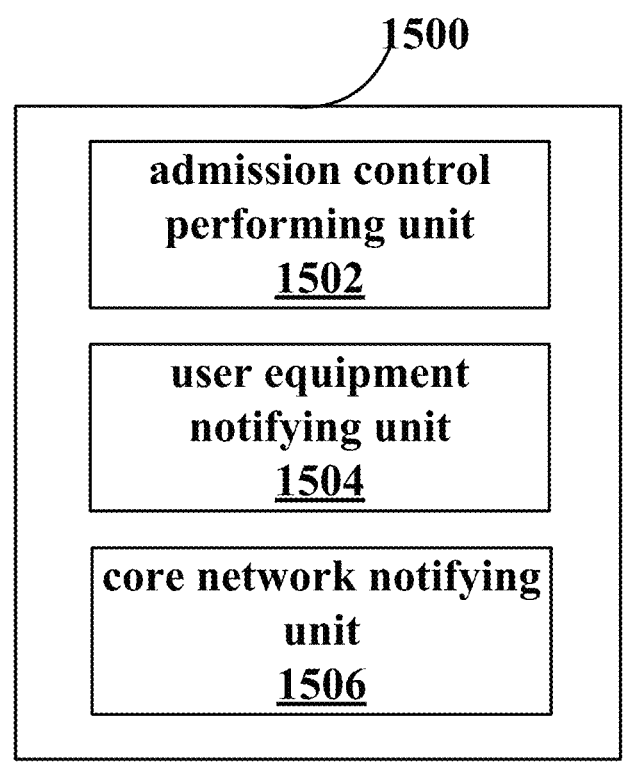
FIG. 15 is a block diagram illustrating an example of functional configuration of the base station in the wireless communication system according to another embodiment of the disclosure.

An example of functional configuration of the base station in the wireless communication system according to another embodiment of the disclosure will be described with reference to FIG. 15 below. FIG. 15 is a block diagram illustrating an example of functional configuration of the base station in the wireless communication system according to another embodiment of the disclosure.

As shown in FIG. 15, the base station 1500 in the wireless communication system according to another embodiment of the disclosure may include an admission control performing unit 1502, a user equipment notifying unit 1504 and a core network notifying unit 1506. Particularly, the functional configuration of the admission control performing unit 1502 is the same as that of the admission control performing unit 1402 described above with reference to FIG. 14, and thus no details thereof will be described herein. Examples of the functional configurations of the user equipment notifying unit 1504 and the core network notifying unit 1506 will be described in detail respectively below.

The user equipment notifying unit 1504 may be configured to notify to the user equipment release of the wireless data connection between the user equipment and the other base station and the result of the admission control.

The core network notifying unit 1506 may be configured to notify the core network to release the core network bearers corresponding to the unacceptable data bearers.

As described above, the admission control performing unit 1502 in the base station 1500 serving as the non-deactivated base station may notify, after performing the admission control, the result about the admission control to the user equipment and the core network, so that the user equipment may release the unacceptable data bearers for the base station 1500 and switch the transmitting and receiving nodes of the acceptable data bearers according to the result of the admission control, and the core network releases the core network bearers corresponding to the unacceptable data bearers according to the result of the admission control.

Figure 16:
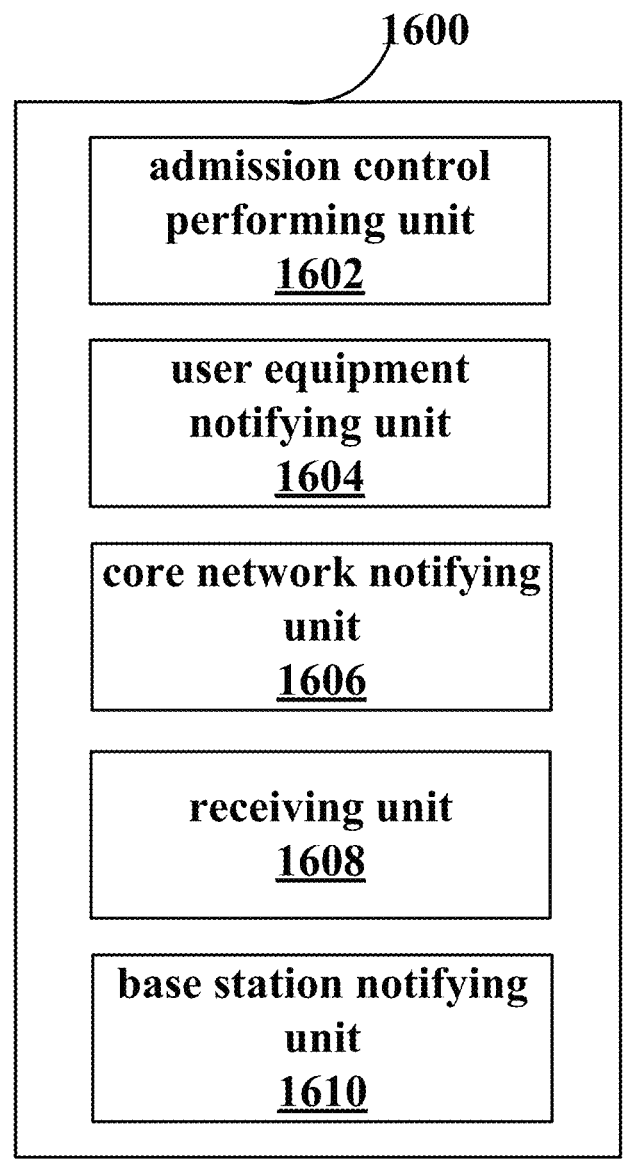
FIG. 16 is a block diagram illustrating an example of functional configuration of the base station in the wireless communication system according to yet another embodiment of the disclosure.

Next, an example of functional configuration of the base station in the wireless communication system according to yet another embodiment of the disclosure will be described with reference to FIG. 16. FIG. 16 is a block diagram illustrating an example of functional configuration of the base station in the wireless communication system according to yet another embodiment of the disclosure.

As shown in FIG. 16, the base station 1600 in the wireless communication system according to another embodiment of the disclosure may include an admission control performing unit 1602, a user equipment notifying unit 1604, a core network notifying unit 1606, a receiving unit 1608 and a base station notifying unit 1610. Particularly, the functional configurations of the admission control performing unit 1602, the user equipment notifying unit 1604 and the core network notifying unit 1606 are the same as those of the admission control performing unit 1502, the user equipment notifying unit 1504 and the core network notifying unit 1506 described above with reference to FIG. 15, and thus no details thereof will be described herein. Examples of the functional configurations of the receiving unit 1608 and the base station notifying unit 1610 will be described in detail respectively below.

The receiving unit 1608 may be configured to receive, if the user equipment or the other base station is the deactivation triggering node and it is judged that the deactivation condition is satisfied, a request for releasing the wireless data connection between the user equipment and the other base station from the user equipment or the other base station.

The base station notifying unit 1610 may be configured to notify, after the admission control performing unit 1602 has performed the admission control according to the request received by the receiving unit 1608, the other base station to release the unacceptable data bearers and transfer the acceptable data bearers to the base station 1600.

It is to be understood that the example of the functional configuration of the base station 1600 as shown in FIG. 16 corresponds to the example of the scene of the deactivation procedure in the case that the user equipment or the deactivated base station serves as the deactivation triggering node, that is, examples of the scenes as shown in FIGS. 2-6. In this case, the request received by the receiving unit 1608 may be for example a "wireless link failure report" or the "deactivation request" from the user equipment, or may be for example the "deactivation request" from the other base station serving as the deactivated base station.

Further, it should also understand that the base station 1600 as shown in FIG. 16 may not include the user equipment notifying unit 1604 and the core network notifying unit 1606, and in this case, the result about the admission control is notified to the user equipment by the other base station, or in a case of air interface transmission, the user equipment may acquire the result of the admission control by parsing the notification to the other base station from the base station notifying unit 1610, and the other base station notifies the core network to release the core network bearers that should be released.

Figure 17:
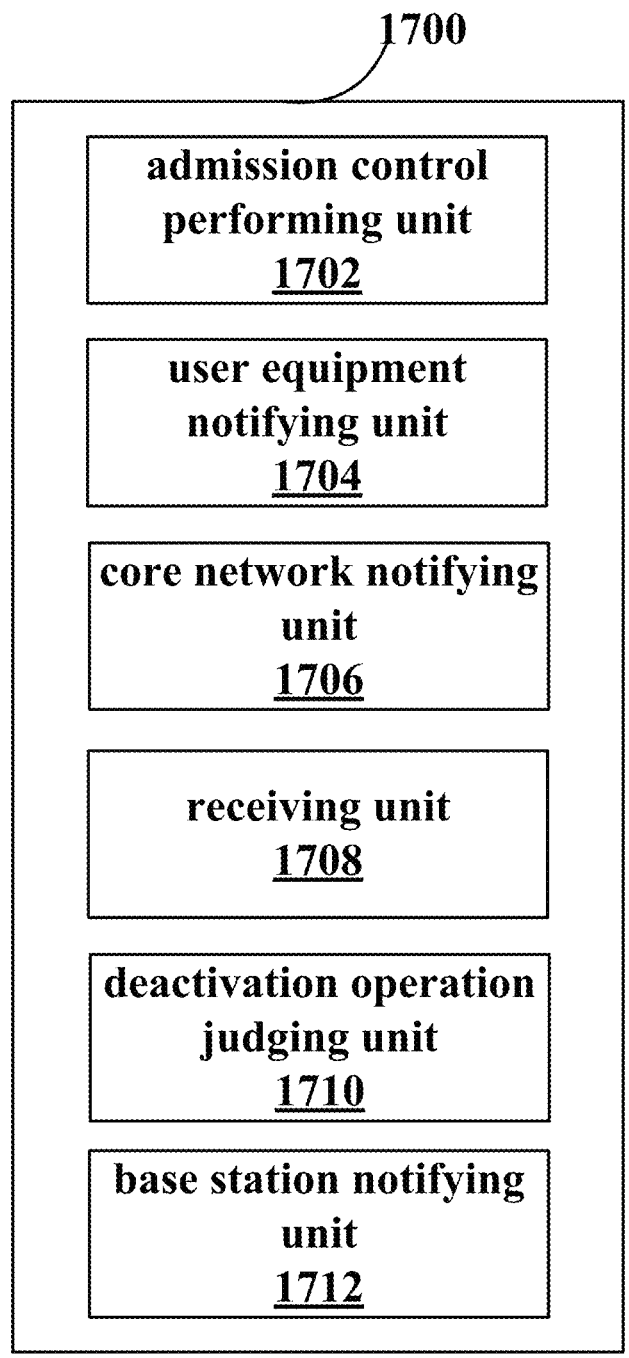
FIG. 17 is a block diagram illustrating an example of functional configuration of the base station in the wireless communication system according to still another embodiment of the disclosure.

An example of functional configuration of the base station in the wireless communication system according to still another embodiment of the disclosure will be described with reference to FIG. 17 below. FIG. 17 is a block diagram illustrating an example of functional configuration of the base station in the wireless communication system according to still another embodiment of the disclosure.

As shown in FIG. 17, the base station 1700 in the wireless communication system according to still another embodiment of the disclosure may include an admission control performing unit 1702, a user equipment notifying unit 1704, a core network notifying unit 1706, a receiving unit 1708, a deactivation operation judging unit 1710 and a base station notifying unit 1712. Particularly, the functional configurations of the admission control performing unit 1702, the user equipment notifying unit 1704 and the core network notifying unit 1706 are the same as those of the admission control performing unit 1502, the user equipment notifying unit 1504 and the core network notifying unit 1506 described above with reference to FIG. 15, and thus no details thereof will be described herein. Examples of the functional configurations of the receiving unit 1708, the deactivation operation judging unit 1710 and the base station notifying unit 1712 will be described in detail respectively below.

The receiving unit 1708 may be configured to receive, if the base station 1700 is the deactivation triggering node, a mobility measurement result of a carrier of the other base station from the user equipment or the other base station.

The deactivation operation judging unit 1710 may be configured to judge whether the deactivation condition is satisfied according to the received mobility measurement result and other inputs.

The base station notifying unit 1712 may be configured to notify, after the admission control performing unit 1702 has performed the admission control according to the judging result of the deactivation operation judging unit 1710, the other base station to release the unacceptable data bearers and transfer the acceptable data bearers to the base station 1700.

It is to be understood that the example of the functional configuration of the base station 1700 as shown in FIG. 17 corresponds to the example of scene of the deactivation procedure in a case that the non-deactivated base station serves as the deactivation triggering node, that is, the examples of the scenes as shown in FIGS. 7 and 8. In this case, the mobility measurement result received by the receiving unit 1708 may be for example the "measurement report" from the user equipment or the other base station, and the notification issued by the base station notifying unit 1712 may be for example the "deactivation notification".

Further, it should also understand that the base station 1700 as shown in FIG. 17 may also not include the user equipment notifying unit 1704 and the core network notifying unit 1706. In this case, the other base station notifies the user equipment of the result about the admission control through for example the "deactivation confirmation", or in a case of air interface transmission, the user equipment may acquire the result of the admission control by parsing the notification to the other base station from the base station notifying unit 1710, and the other base station notifies the core network bearers that should be released to the core network.

Figure 18:
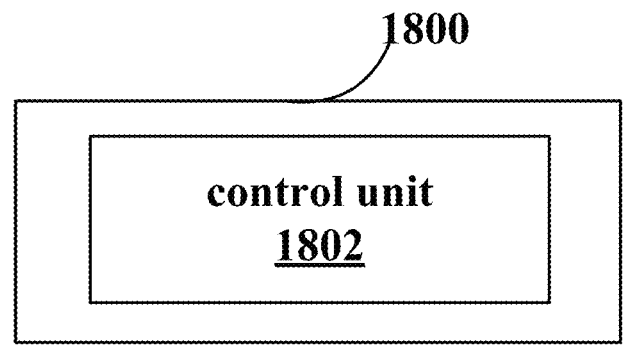
FIG. 18 is a block diagram illustrating an example of functional configuration of a user equipment in a wireless communication system according to an embodiment of the disclosure.

FIG. 18 is a block diagram illustrating an example of functional configuration of a user equipment in a wireless communication system according to an embodiment of the disclosure. In the wireless communication system, the user equipment simultaneously performs wireless data connections with the deactivated base station and the non-deactivated base station over different carriers.

As shown in FIG. 18, the user equipment 1800 in the wireless communication system according to the embodiment of the disclosure may include a control unit 1802.

The control unit 1802 may be configured to trigger, if a deactivation triggering node judges a deactivation condition is satisfied, the user equipment 1800 to release the wireless data connection with the deactivated base station.

Preferably, as an example but not limitation, the deactivation condition may include at least one of the following: a primary carrier signal quality between the user equipment and the deactivated base station is lower than a predetermined signal quality threshold; time length for which the user equipment performs data transmission with the non-deactivated base station is longer than a predetermined time length threshold; the non-deactivated base station is to share load for the deactivated base station; power consumption that the user equipment performs uplink transmission with a single node is less than power consumption that the user equipment performs uplink transmission with dual nodes by a predetermined power consumption threshold; when the user equipment needs to transfer the wireless data connection with the deactivated base station to a new wireless base station, it needs to combine a procedure to establish wireless data connection with the new wireless base station and the non-deactivated base station with a procedure to release the wireless data connection with the deactivated base station; wireless link failure occurs between the user equipment and the deactivated base station; and the user equipment needs to establish wireless data connection with the deactivated base station at the same time in a scene that the user equipment only has wireless data connection with the non-deactivated base station, but an initial access procedure with respect to the deactivated base station by the user equipment fails.

Figure 19:
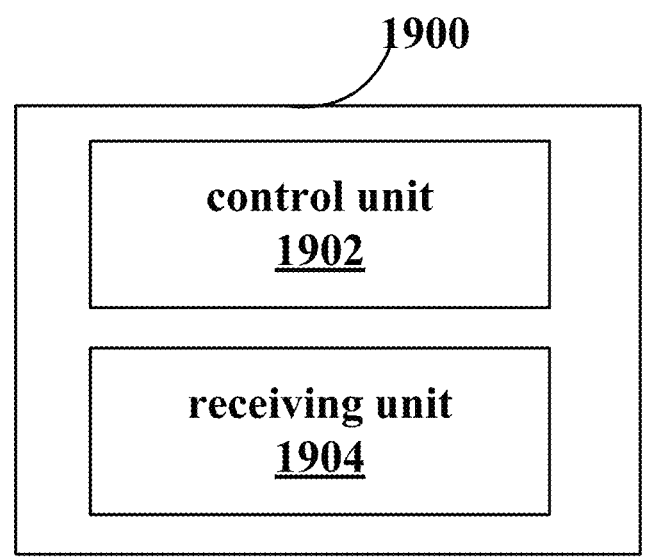
FIG. 19 is a block diagram illustrating an example of functional configuration of the user equipment in the wireless communication system according to another embodiment of the disclosure.

An example of functional configuration of the user equipment in the wireless communication system according to another embodiment of the disclosure will be described with reference to FIG. 19 below. FIG. 19 is a block diagram illustrating an example of functional configuration of the user equipment in the wireless communication system according to another embodiment of the disclosure.

As shown in FIG. 19, the user equipment 1900 in the wireless communication system according to another embodiment of the disclosure may include a control unit 1902 and a receiving unit 1904. Particularly, the functional configuration of the control unit 1902 is the same as that of the control unit 1802 described above with reference to FIG. 18, and thus no details thereof will be described herein. An example of functional configuration of the receiving unit 1904 will be described in detail below.

The receiving unit 1904 may be configured to receive the notification for releasing the wireless data connection between the user equipment and the deactivated base station from the deactivated base station or the non-deactivated base station.

Preferably, the control unit 1902 may trigger, according to the notification received by the receiving unit 1904, release of data bearers unacceptable by the non-deactivated base station among data bearers between the user equipment 1900 and the deactivated base station and transmitting and receiving of acceptable data bearers over a service carrier of the non-deactivated base station.

Figure 20:
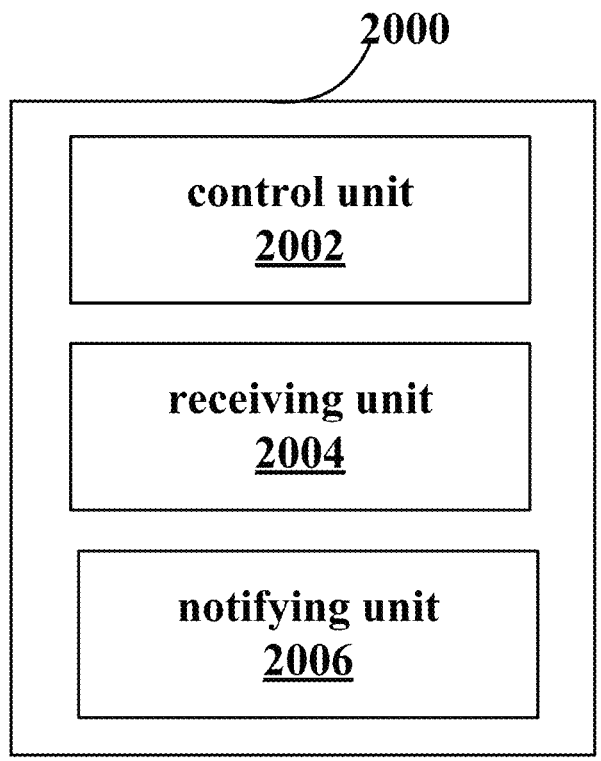
FIG. 20 is a block diagram illustrating an example of functional configuration of the user equipment in the wireless communication system according to yet another embodiment of the disclosure.

An example of functional configuration of the user equipment in the wireless communication system according to yet another embodiment of the disclosure will be described with reference to FIG. 20 below. FIG. 20 is a block diagram illustrating an example of functional configuration of the user equipment in the wireless communication system according to yet another embodiment of the disclosure.

As shown in FIG. 20, the user equipment 2000 in the wireless communication system according to yet another embodiment of the disclosure may include a control unit 2002, a receiving unit 2004 and a notifying unit 2006. Particularly, the functional configurations of the control unit 2002 and the receiving unit 2004 are the same as those of the control unit 1902 and the receiving unit 1904 described above with reference to FIG. 19, and thus no details thereof will be described herein. An example of functional configuration of the notifying unit 2006 will be described in detail below.

The notifying unit 2006 may be configured to issue, if the user equipment 2000 is the deactivation triggering node and the deactivation condition is satisfied, a notification to the non-deactivated base station so as to trigger release of the wireless data connection between the user equipment and the deactivated base station.

It should understand that the example of the functional configuration of the user equipment 2000 as shown in FIG. 20 corresponds to the example of the scene of the deactivation procedure in a case that the user equipment serves as the deactivation triggering node, that is, the examples of the scenes as shown in FIGS. 2-4. In this case, the notifying unit 2006 may for example notify the "wireless link failure report" or the "deactivation request" to the non-deactivated base station.

Figure 21:
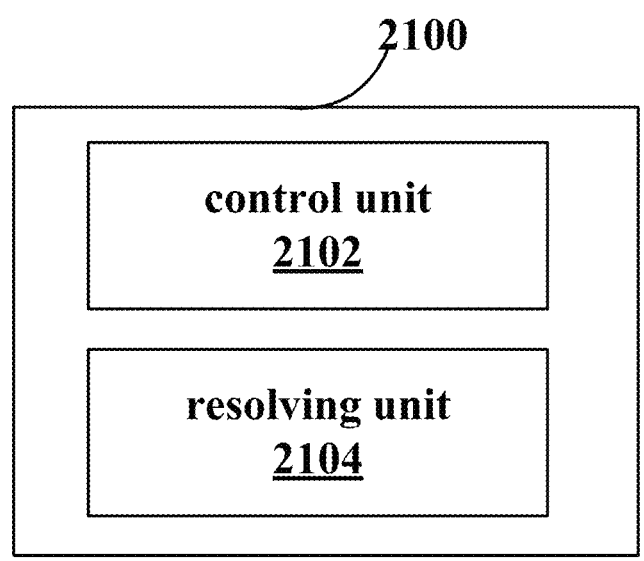
FIG. 21 is a block diagram illustrating an example of functional configuration of the user equipment in the wireless communication system according to still another embodiment of the disclosure.

Next, an example of functional function of the user equipment in the wireless communication system according to still another embodiment of the disclosure will be described with reference to FIG. 21. FIG. 21 is a block diagram illustrating an example of functional function of the user equipment in the wireless communication system according to still another embodiment of the disclosure.

As shown in FIG. 21, the user equipment 2100 in the wireless communication system according to still another embodiment of the disclosure may include a control unit 2102 and a parsing unit 2104. Particularly, the functional configuration of the control unit 2102 is the same as that of the control unit 1802 described above with reference to FIG. 18, and thus no details thereof will be described herein. An example of functional configuration of the parsing unit 2104 will be described in detail below.

The parsing unit 2104 may be configured to parse, if the deactivated base station or the non-deactivated base station is the deactivation triggering node, a notification regarding release of the wireless data connection between the user equipment and the deactivated base station from the non-deactivated base station or the deactivated base station.

Preferably, the control unit 2102 may trigger, according to a parsing result, release of data bearers unacceptable by the non-deactivated base station among data bearers between the user equipment 2100 and the deactivated base station and transmitting and receiving of acceptable data bearers over a service carrier of the non-deactivated base station.

It is to be understood that the example of the functional configuration of the user equipment 2100 as shown in FIG. 21 corresponds to the example of the scene of the deactivation procedure in a case of the deactivated base station or the non-deactivated base station being the deactivation triggering node and air interface transmission, that is, the examples of the scenes as shown in FIGS. 5-8 in case of air interface transmission. In this case, there is no need for the user equipment 2100 to provide a dedicated receiving unit to receive the notification from the deactivated base station or the non-deactivated base station, and the acceptable data bearers and unacceptable data bearers for the non-deactivated base station may be determined by parsing for example the "deactivation response" from the non-deactivated base station or the "deactivation notification" from the deactivated base station by the parsing unit 2104.

Further, preferably, the user equipment according to the embodiment of the disclosure may further include a measurement result reporting unit which may be configured to report, if the deactivated base station or the non-deactivated base station is the deactivation triggering node, a mobility measurement result of a carrier of the deactivated base station to the deactivated base station and/or the non-deactivated base station. The case may for example correspond to the examples of the scenes as shown in FIGS. 5-8 for example.

Figure 22:
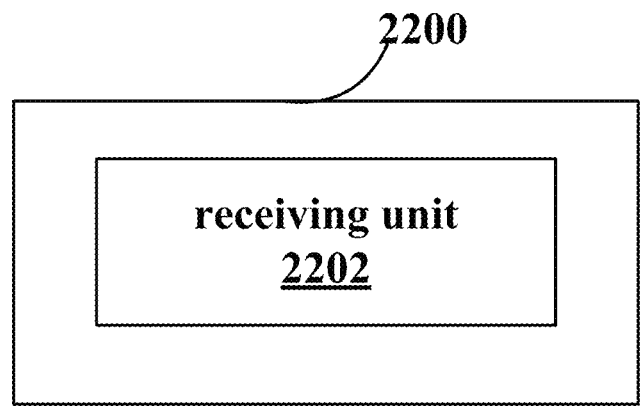
FIG. 22 is a block diagram illustrating an example of functional configuration of a device in a wireless communication system according to an embodiment of the disclosure.

FIG. 22 is a block diagram illustrating an example of functional configuration of a device in a wireless communication system according to an embodiment of the disclosure. In the wireless communication system, the wireless communication system includes the deactivated base station, the non-deactivated base station and the user equipment, the user equipment simultaneously performs wireless data connections with the deactivated base station and the non-deactivated base station over different carriers, and a deactivation triggering node triggers a deactivation procedure to release the wireless data connection between the deactivated base station and the user equipment if it is judged that a deactivation condition is satisfied.

As shown in FIG. 22, the device 2200 in the wireless communication system according to the embodiment of the disclosure may include a receiving unit 2202. Preferably, the device 2200 may be a device on the core network side.

The receiving unit 2202 may be configured to receive one or more of the following from the deactivated base station or the non-deactivated base station: information about the non-deactivated base station, information about the deactivated base station, information about core network bearers corresponding to accepted data bearers and unaccepted data bearers, information about the deactivation condition, information about master-slave relationship between the non-deactivated base station and the deactivated base station and information about the user equipment.

Figure 23:
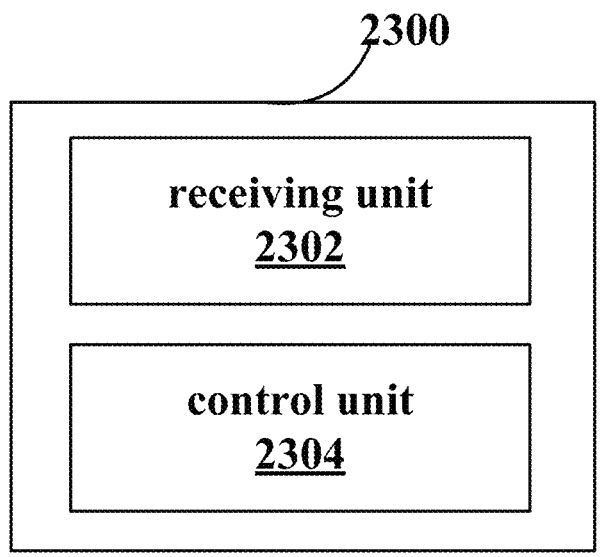
FIG. 23 is a block diagram illustrating an example of functional configuration of the device in the wireless communication system according to another embodiment of the disclosure.

An example of functional configuration of the device in the wireless communication system according to another embodiment of the disclosure will be described with reference to FIG. 23 below. FIG. 23 is a block diagram illustrating an example of functional configuration of the device in the wireless communication system according to another embodiment of the disclosure.

As shown in FIG. 23, the device 2300 in the wireless communication system according to another embodiment of the disclosure may include a receiving unit 2302 and a control unit 2304. Particularly, the functional configuration of the receiving unit 2302 is the same as that of the receiving unit 2202 described above with reference to FIG. 22, and thus no details thereof will be described herein. Only an example of functional configuration of the control unit 2304 will be described in detail below.

The control unit 2304 may be configured to trigger, if it is judged that data of the deactivated base station is not directly forwarded from the non-deactivated base station according to the information received by the receiving unit 2302, a path transfer operation for core network bearers corresponding to the acceptable data bearers after receiving notification information about the deactivation procedure, which is issued by the non-deactivated base station after completing admission control.

Figure 24:
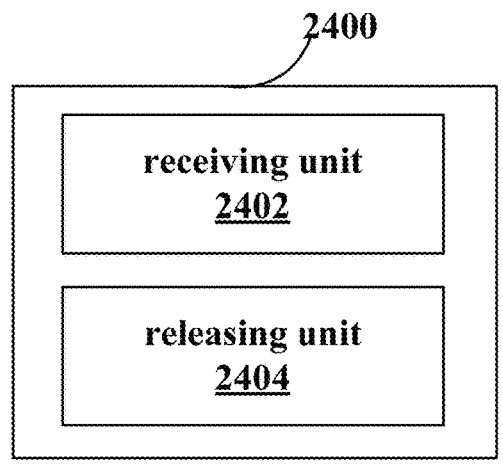
FIG. 24 is a block diagram illustrating an example of functional configuration of the device in the wireless communication system according to yet another embodiment of the disclosure.

Next, an example of functional configuration of the device in the wireless communication system according to yet another embodiment of the disclosure will be described with reference to FIG. 24. FIG. 24 is a block diagram illustrating an example of functional configuration of the device in the wireless communication system according to yet another embodiment of the disclosure.

As shown in FIG. 24, the device 2400 in the wireless communication system according to yet another embodiment of the disclosure may include a receiving unit 2402 and a releasing unit 2404. Particularly, the functional configuration of the receiving unit 2402 is the same as that of the receiving unit 2202 described above with reference to FIG. 22, and thus no details thereof will be described herein. Only an example of functional configuration of the releasing unit 2404 will be described in detail below.

The releasing unit 2404 may be configured to release, according to the information received by the receiving unit 2402, core network bearers corresponding to the unacceptable data bearers in response to a notification from the non-deactivated base station or the deactivated base station.

It should understand that although the examples of the functional configurations of the base station, the user equipment and the device in the wireless communication system according to the embodiments of the disclosure have been described above with reference to FIGS. 10-24, it should understand that this constructs no limitation on the disclosure, and those skilled in the art may perform combination, sub-combination and alternation or the like on the above configurations according to the principle of the disclosure.

Further, the embodiment of the disclosure further provides a storage medium including machine readable program codes which when executed on an information processing apparatus, cause the information processing apparatus to perform the foregoing method for use in the wireless communication system according to the embodiment of the disclosure.

Further, the embodiment of the disclosure further provides a program product including machine executable instructions which when executed on an information processing apparatus, cause the information processing apparatus to perform the foregoing method for use in the wireless communication system according to the embodiment of the disclosure.

Accordingly, a storage medium on which the above program product storing machine readable instruction codes is carried is also included in the disclosure of the invention. The storage medium includes but not limited to a floppy disk, an optical disk, a magneto-optical disk, a storage card, a memory rod and the like.

Furthermore, it shall be noted that the foregoing series of processes and apparatuses can also be embodied in software and/or firmware. In the case of being embodied in software and/or firmware, a program constituting the software is installed from a storage medium or a network to a computer with a dedicated hardware structure, e.g., a general purpose personal computer 2500 illustrated in FIG. 25, which can perform various functions when various programs are installed thereon.

Figure 25:
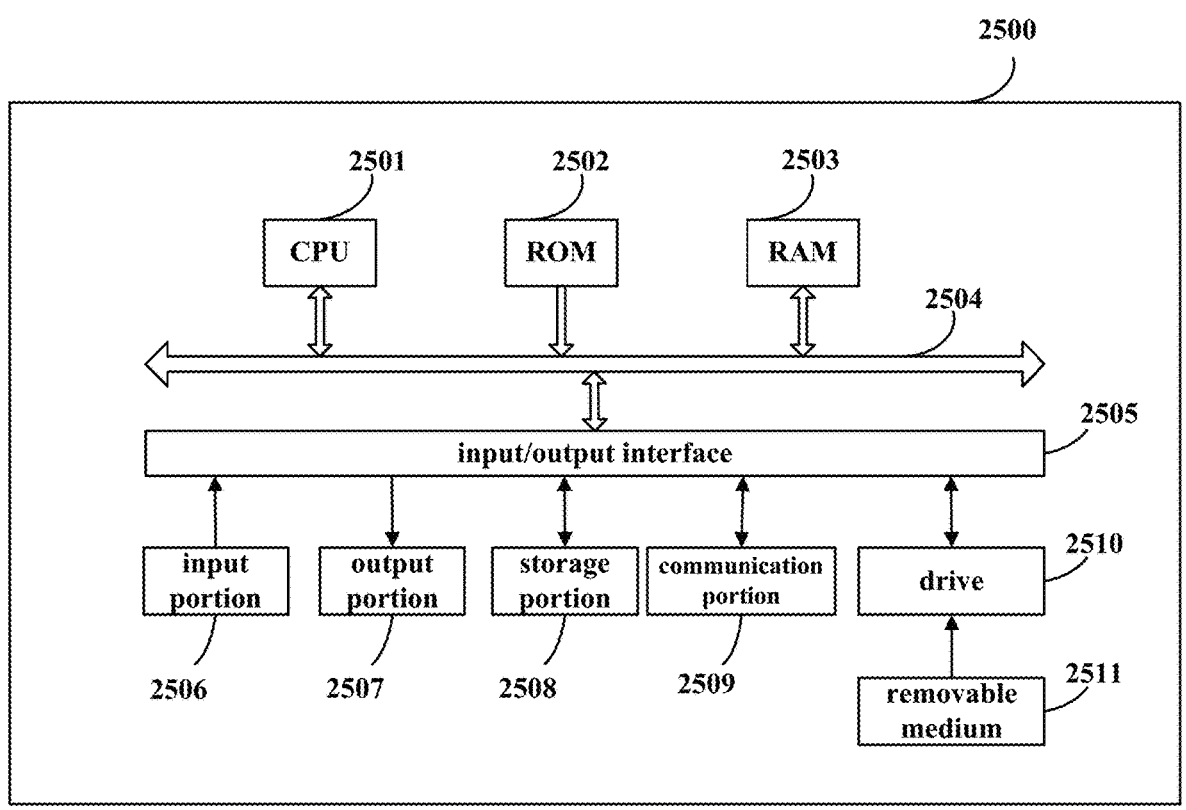
FIG. 25 is a block diagram illustrating an exemplary structure of a personal computer as an information processing apparatus that may be used in an embodiment of the disclosure.

In FIG. 25, a Central Processing Unit (CPU) 2501 performs various processes according to a program stored in a Read Only Memory (ROM) 2502 or loaded from a storage portion 2508 into a Random Access Memory (RAM) 2503 in which data required when the CPU 2501 performs the various processes is also stored as needed.

The CPU 2501, the ROM 2502 and the RAM 2503 are connected to each other via a bus 2504 to which an input/output interface 2505 is also connected.

The following components are connected to the input/output interface 2505: an input portion 2506 including a keyboard, a mouse, etc.; an output portion 2507 including a display, e.g., a Cathode Ray Tube (CRT), a Liquid Crystal Display (LCD), etc., a speaker, etc.; a storage portion 2508 including a hard disk, etc.; and a communication portion 2509 including a network interface card, e.g., an LAN card, a modem, etc. The communication portion 2509 performs a communication process over a network, e.g., the Internet.

A drive 2510 is also connected to the input/output interface 2505 as needed. A removable medium 2511, e.g., a magnetic disk, an optical disk, an magneto optical disk, a semiconductor memory, etc., can be installed on the drive 2510 as needed so that a computer program fetched therefrom can be installed into the storage portion 2508 as needed.

In the case that the foregoing series of processes are performed in software, a program constituting the software is installed from a network, e.g., the Internet, etc., or a storage medium, e.g., the removable medium 2511, etc.

Those skilled in the art shall appreciate that such a storage medium will not be limited to the removable medium 2511 illustrated in FIG. 25 in which the program is stored and which is distributed separately from the apparatus to provide a user with the program. Examples of the removable medium 2511 include a magnetic disk (including a Floppy Disk (a registered trademark)), an optical disk (including Compact Disk-Read Only memory (CD-ROM) and a Digital Versatile Disk (DVD)), a magneto optical disk (including a Mini Disk (MD) (a registered trademark)) and a semiconductor memory. Alternatively the storage medium can be the ROM 2502, a hard disk included in the storage portion 2508, etc., in which the program is stored and which is distributed together with the apparatus including the same to the user.

It shall further be noted that the steps of the foregoing series of processes may naturally but not necessarily be performed in the sequential order as described chronically. Some of the steps may be performed concurrently or separately from each other.

Although the disclosure and the advantages thereof have been described in details, it shall be appreciated that various modifications, substitutions and variations can be made without departing from the spirit and scope of the disclosure as defined by the appended claims. Furthermore the terms "include", "comprise" or any variants thereof in the embodiments of the disclosure are intended to encompass nonexclusive inclusion so that a process, method, article or apparatus including a series of elements includes both those elements and one or more other elements which are listed explicitly or an element(s) inherent to the process, method, article or device. Without much more limitation, an element being defined by a sentence "include/comprise a(n) . . . " will not exclude presence of an additional identical element(s) in the process, method, article or device including the element.

The invention claimed is:

1. A base station in a wireless communication system, the base station comprising:
   circuitry configured to
   perform a wireless data connection with a user equipment (UE) with a carrier when an other base station performs wireless data connection with the UE over a different carrier;
   send a release request to the other base station to release the wireless data connection between the base station and the UE in a case that the base station is a triggering node;
   receive a deactivation notification from the other base station to release the wireless data connection between the base station and the UE; and
   release the wireless data connection between the UE and the base station, wherein
   first data bearers are released by the base station so that a wireless data connection between the UE and the other base station is performed without performing the wireless data connection between the UE and the base station, and
   before releasing the wireless data connection between the UE and the base station, data for the UE on the first data bearers are forwarded from the other base station to the base station but not directly from a core network.

2. The base station according to claim 1, wherein the circuitry is further configured to perform communication with the other base station via a radio interface and receive the deactivation notification via the radio interface.

3. The base station according to claim 1, wherein the circuitry is further configured to determine whether to perform data forwarding based on corresponding characteristics of the first data bearers.

4. The base station according to claim 3, wherein the corresponding characteristics of the first data bearers includes a transmission mode, the transmission mode comprising Un-acknowledged Mode (UM).

5. The base station according to claim 3, wherein the circuitry is configured to perform a packet data convergence protocol (PDCP) synchronization operation on the first data bearers for which data forwarding is determined.

6. The base station according to claim 1, wherein the circuitry is configured to release second data bearers of the UE, the second data bearers being directly from the core network, and a path update is initiated.

7. The base station according to claim 1, wherein the circuitry is configured to determine if a release condition is met and then send the release request in the case that the base station is the triggering node.

8. The base station according to claim 7, wherein the circuitry is configured to provide the UE with measurement control message and receive a measurement report from the UE and determine if the release condition is met based on the measurement report.

9. The base station according to claim 7, wherein the circuitry is configured to determine the release condition is met in a case that a primary carrier signal quality from the base station to the UE is below a predetermined threshold.

10. The base station according to claim 7, wherein the circuitry is configured to determine if the release condition is met based on traffic load of the base station.

11. The base station according to claim 7, wherein the circuitry is configured to determine if the release condition is met based on power consumption efficiency.

12. The base station according to claim 11, wherein the circuitry is configured to determine if the release condition is met based on power consumption efficiency of the UE under dual nodes communication mode and single node communication mode.

13. The base station according to claim 7, wherein the circuitry is configured to determine the release condition is met in a case that radio link failure is detected between the UE and the base station.

14. The base station according to claim 7, wherein the circuitry is configured to determine the release condition is met in a case that time length for which the UE performs data transmission with the base station is longer than a predetermined time length threshold.

15. The base station according to claim 7, wherein the circuitry is configured to determine the release condition is met in a case that power consumption that the UE performs uplink transmission with a single node is less than power consumption that the UE performs uplink transmission with dual nodes by a predetermined power consumption threshold.

16. The base station according to claim 1, wherein the circuitry is configured to receive the deactivation notification from the other base station without sending the release request in a case that the other base station is the triggering node.

17. The base station according to claim 16, wherein the circuitry is configured to provide the UE with measurement control message and receive a measurement result from the UE, and provide the measurement result to the other base station for determining if a release condition is met.

18. The base station according to claim 1, wherein the circuitry is configured to acquire data forwarding indication information from the deactivation notification and forward data to the other base station based on the indication.

19. A base station, comprising:
at least one processor; and
at least one memory including computer program code, wherein the at least one memory and the computer program code are configured, with the at least one processor, to cause the base station to:
perform a wireless data connection with a user equipment (UE) with a carrier when an other base station performs wireless data connection with the UE over a different carrier;
send a release request to the other base station to release the wireless data connection between the base station and the UE in a case that the base station is a triggering node;
receive a deactivation notification from the other base station to release the wireless data connection between the base station and the UE; and
release the wireless data connection between the UE and the base station, wherein
first data bearers are released by the base station so that a wireless data connection between the UE and the other base station is performed without performing the wireless data connection between the UE and the base station, and
before releasing the wireless data connection between the UE and the base station, data for the UE on the first data bearers are forwarded from the other base station to the base station but not directly from a core network.

20. The base station according to claim 19, wherein the at least one memory and the computer program code are configured, with the at least one processor, to cause the base station to perform communication with the other base station via a radio interface and receive the deactivation notification via the radio interface.

21. The base station according to claim 19, wherein the at least one memory and the computer program code are configured, with the at least one processor, to cause the base station to determine whether to perform data forwarding based on corresponding characteristics of the first data bearers.

22. The base station according to claim 21, wherein the corresponding characteristics of the first data bearers includes a transmission mode, the transmission mode comprising Un-acknowledged Mode (UM).

23. The base station according to claim 21, wherein the at least one memory and the computer program code are configured, with the at least one processor, to cause the base station to perform a packet data convergence protocol (PDCP) synchronization operation on the first data bearers for which data forwarding is determined.

24. The base station according to claim 19, wherein the at least one memory and the computer program code are configured, with the at least one processor, to cause the base station to release second data bearers of the UE, the second data bearers being directly from the core network, and a path update is initiated.

25. The base station according to claim 19, wherein the at least one memory and the computer program code are configured, with the at least one processor, to cause the base station to determine if a release condition is met and then send the release request in the case that the base station is the triggering node.

26. The base station according to claim 25, wherein the at least one memory and the computer program code are configured, with the at least one processor, to cause the base station to provide the UE with measurement control message and receive a measurement report from the UE and determine if the release condition is met based on the measurement report.

27. The base station according to claim 25, wherein the at least one memory and the computer program code are configured, with the at least one processor, to cause the base station to determine the release condition is met in a case that a primary carrier signal quality from the base station to the UE is below a predetermined threshold.

28. The base station according to claim 25, wherein the at least one memory and the computer program code are configured, with the at least one processor, to cause the base station to determine if the release condition is met based on traffic load of the base station.

29. The base station according to claim 25, wherein the at least one memory and the computer program code are configured, with the at least one processor, to cause the base station to determine if the release condition is met based on power consumption efficiency.

30. The base station according to claim 29, wherein the at least one memory and the computer program code are configured, with the at least one processor, to cause the base station to determine if the release condition is met based on power consumption efficiency of the UE under dual nodes communication mode and single node communication mode.

31. The base station according to claim 25, wherein the at least one memory and the computer program code are configured, with the at least one processor, to cause the base station to determine the release condition is met in a case that radio link failure is detected between the UE and the base station.

32. The base station according to claim 25, wherein the at least one memory and the computer program code are configured, with the at least one processor, to cause the base station to determine the release condition is met in a case that time length for which the UE performs data transmission with the base station is longer than a predetermined time length threshold.

33. The base station according to claim 25, wherein the at least one memory and the computer program code are configured, with the at least one processor, to cause the base station to determine the release condition is met in a case that power consumption that the UE performs uplink transmission with a single node is less than power consumption that the UE performs uplink transmission with dual nodes by a predetermined power consumption threshold.

34. The base station according to claim 19, wherein the at least one memory and the computer program code are configured, with the at least one processor, to cause the base station to receive the deactivation notification from the other base station without sending the release request in a case that the other base station is the triggering node.

35. The base station according to claim 34, wherein the at least one memory and the computer program code are configured, with the at least one processor, to cause the base station to provide the UE with measurement control message and receive a measurement result from the UE, and provide the measurement result to the other base station for determining if a release condition is met.

36. The base station according to claim 19, wherein the at least one memory and the computer program code are configured, with the at least one processor, to cause the base station to acquire data forwarding indication information from the deactivation notification and forward data to the other base station based on the indication.

* * * * *